(12) United States Patent
Bohn et al.

(10) Patent No.: US 8,305,106 B2
(45) Date of Patent: Nov. 6, 2012

(54) ELECTRONIC SELF-HEALING METHODS FOR RADIO-FREQUENCY RECEIVERS

(75) Inventors: Florian Bohn, Pasadena, CA (US);
Seyed Ali Hajimiri, Pasadena, CA (US);
Hua Wang, Hillsboro, OR (US); Yu-Jiu Wang, Shengang Township (TW)

(73) Assignee: California Institute of Technology, Pasadena, CA (US)

( * ) Notice: Subject to any disclaimer, the term of this patent is extended or adjusted under 35 U.S.C. 154(b) by 256 days.

(21) Appl. No.: 12/806,906

(22) Filed: Aug. 24, 2010

(65) Prior Publication Data

US 2011/0057682 A1  Mar. 10, 2011

Related U.S. Application Data

(60) Provisional application No. 61/236,458, filed on Aug. 24, 2009.

(51) Int. Cl.
*G01R 31/02* (2006.01)

(52) U.S. Cl. ................. 324/762.02; 324/750.3

(58) Field of Classification Search .......... 324/762.01–762.06, 750.3; 714/724, 714/733–734; 438/14; 375/344–345
See application file for complete search history.

(56) References Cited

U.S. PATENT DOCUMENTS

| | | | |
|---|---|---|---|
| 5,646,521 A | 7/1997 | Rosenthal et al. | |
| 5,659,312 A | 8/1997 | Sunter et al. | |
| 6,331,770 B1 | 12/2001 | Sugamori | |
| 6,456,102 B1 | 9/2002 | Mori et al. | |
| 6,731,101 B2 * | 5/2004 | Miyagawa et al. | 324/76.79 |
| 7,339,388 B2 * | 3/2008 | Aghababazadeh et al. | 324/750.3 |
| 2004/0061488 A1 * | 4/2004 | Rosenbaum et al. | 324/76.53 |

OTHER PUBLICATIONS

International Search Report dated Jun. 21, 2011 in corresponding International Application No. PCT/US2010/002322.
Written Opinion dated Jun. 21, 2011 in corresponding International Application No. PCT/US2010/002322.

* cited by examiner

*Primary Examiner* — Arleen M Vazquez
(74) *Attorney, Agent, or Firm* — Milstein Zhang & Wu LLC; Joseph B. Milstein

(57) ABSTRACT

Systems and methods for providing self-healing integrated circuits. The method is characterized in that the behavior of a circuit or a device in response to an input signal is observed. One or more operational parameters or characteristics of the circuit or the device are derived. A corrective action to bring the operational parameters or characteristics of the circuit or device within a desired range is deduced, if needed. The corrective action can be the application of a correction signal or a modification of one or more parameters or characteristics of an element in the circuit. The calculated corrective action, if needed, is applied to bring the operational parameters or characteristics of the circuit or device within the desired range. Optionally, the operational parameters or characteristics of the circuit or the device after the correction is effectuated can be checked.

15 Claims, 25 Drawing Sheets

FIG. 4A
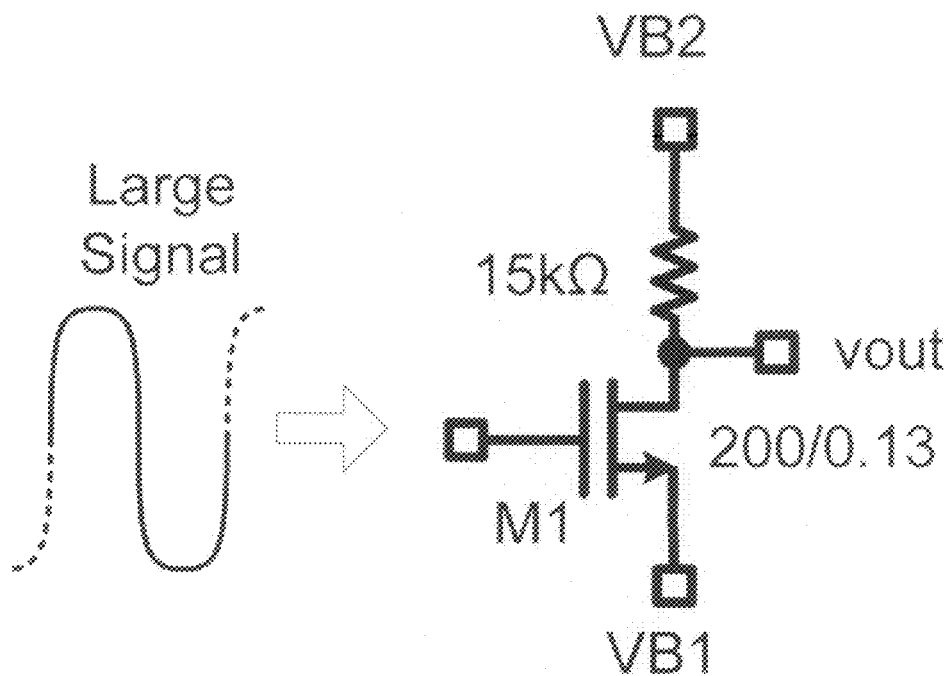
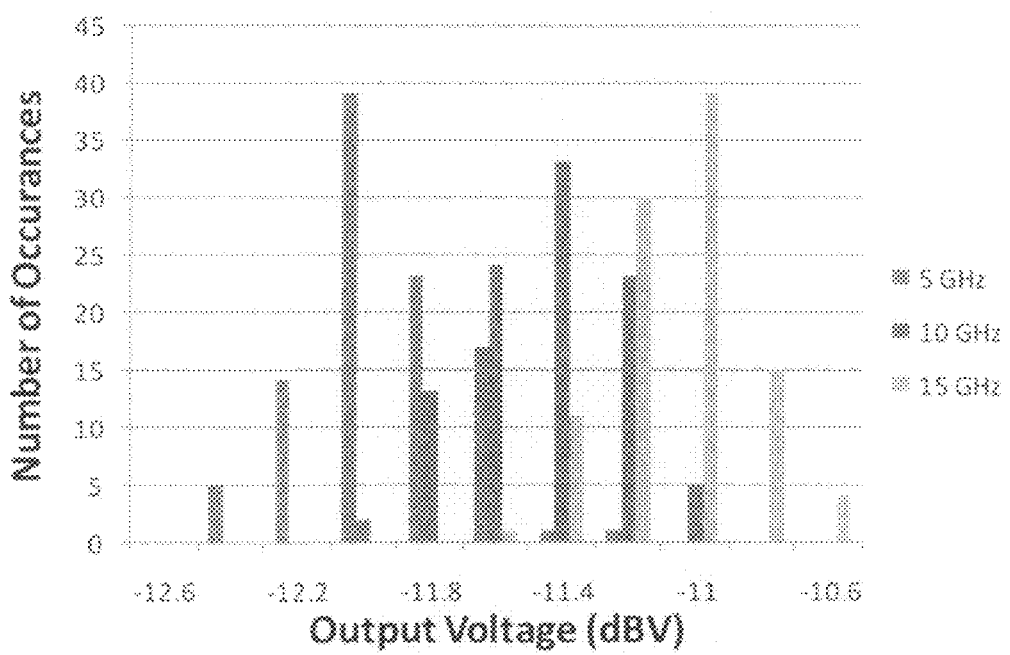
FIG. 4B

FIG. 6A
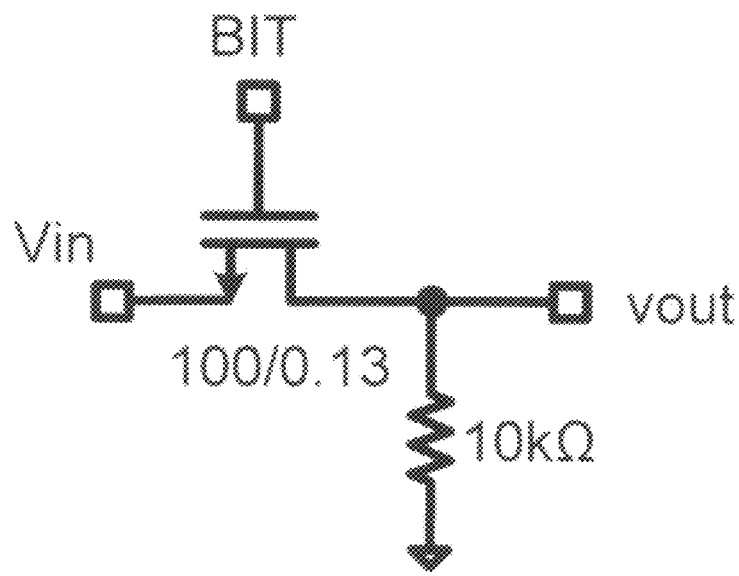
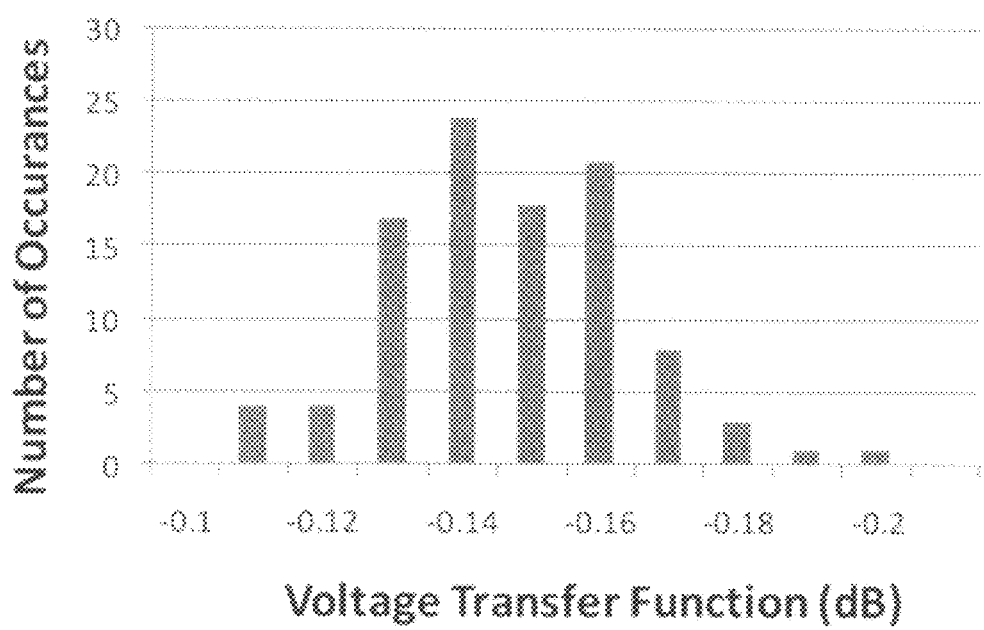
FIG. 6B

FIG. 7A
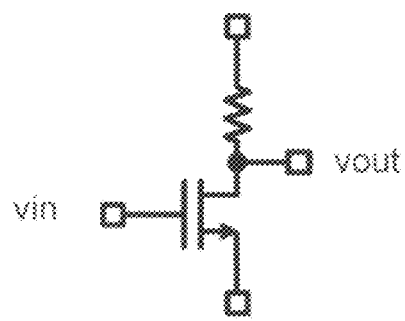
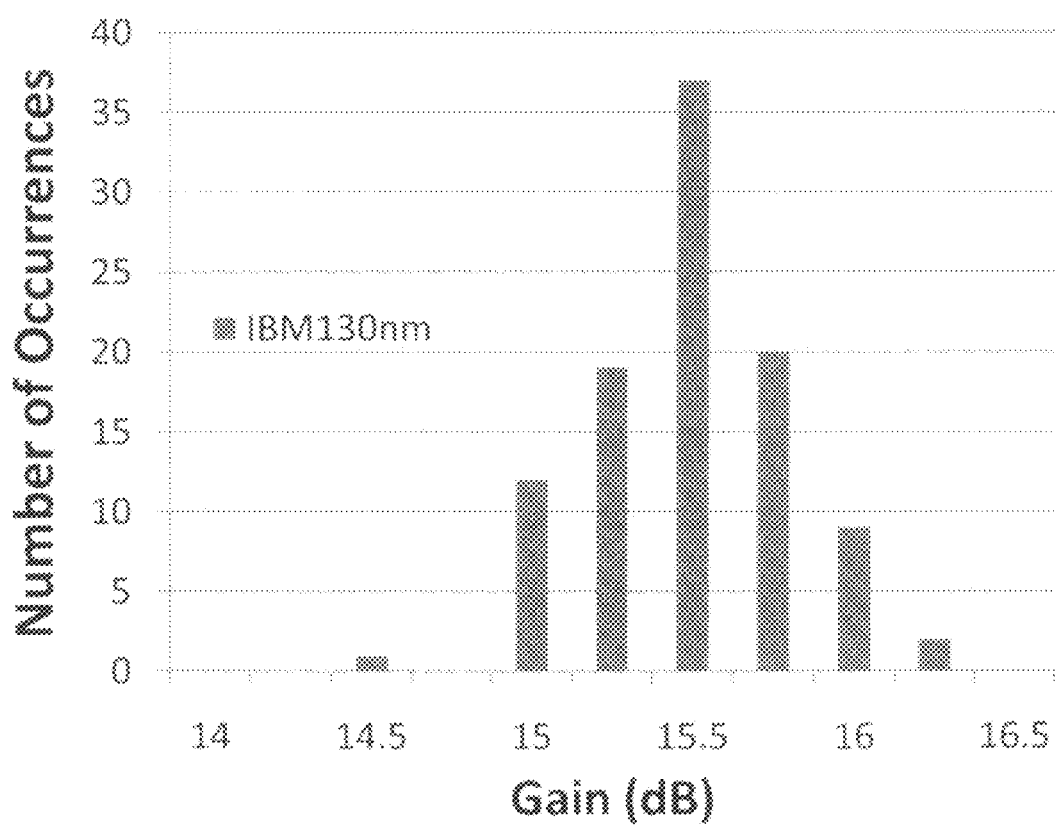
FIG. 7B

TABLE 2
|  | IBM (1-stage) | UMC (1-stage) | IBM (3-stage) | UMC (3-stage) |
|---|---|---|---|---|
| Average Gain (dB) | 15.39 | 17.74 | 40.60 | 45.52 |
| Standard Deviation (dB) | 1.09 | 0.47 | 2.88 | 3.08 |
FIG. 9A
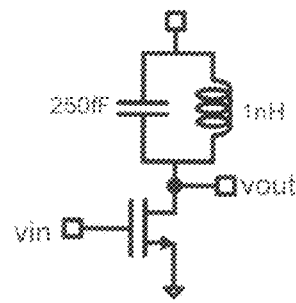
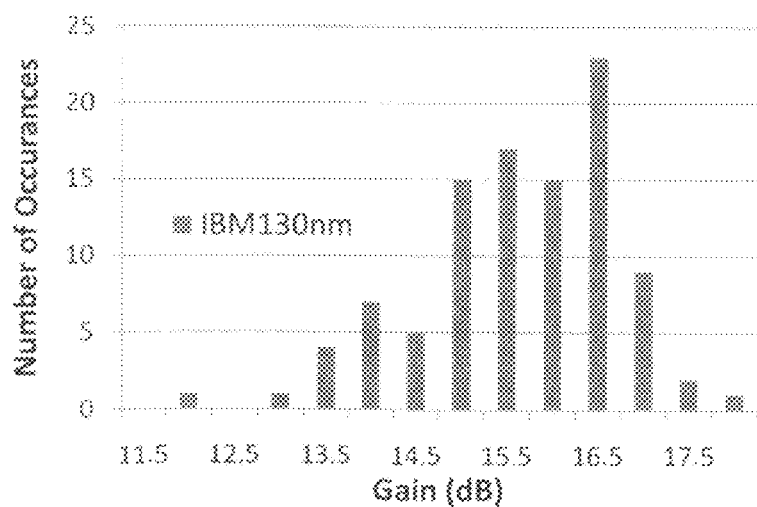
FIG. 9B FIG. 10B
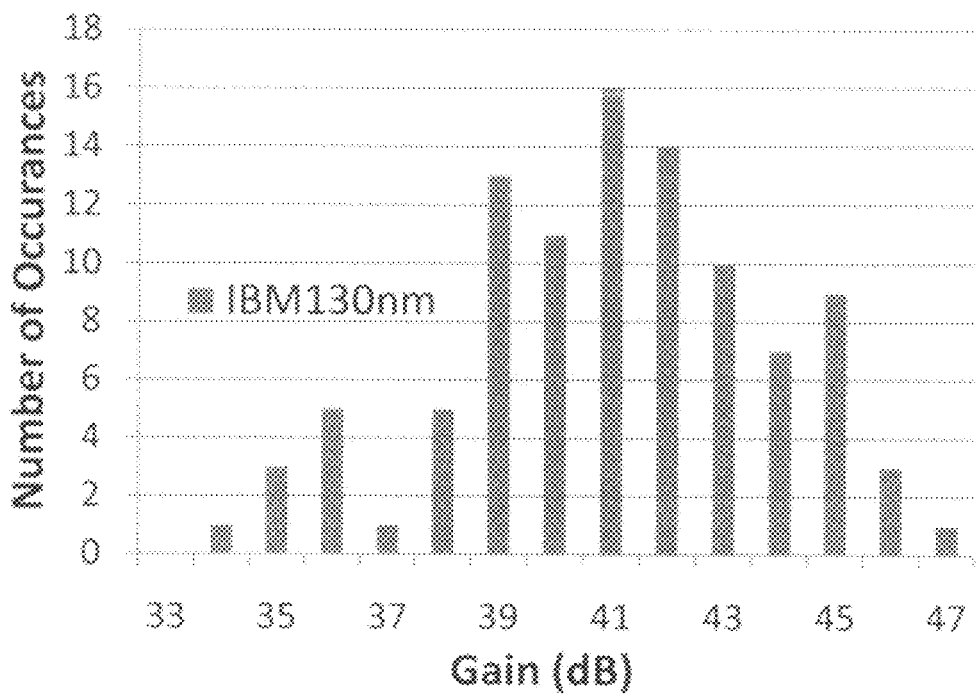
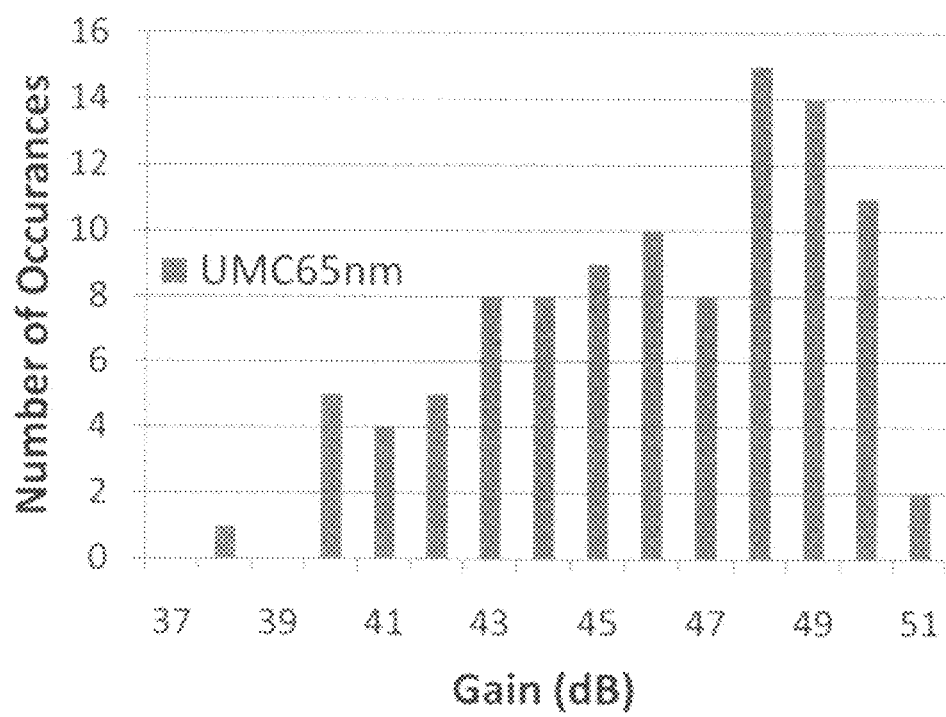
FIG. 10C

ELECTRONIC SELF-HEALING METHODS FOR RADIO-FREQUENCY RECEIVERS

CROSS-REFERENCE TO RELATED APPLICATIONS

This application claims priority to and the benefit of U.S. provisional patent application Ser. No. 61/236,458, filed Aug. 24, 2009, which application is incorporated herein by reference in its entirety.

STATEMENT REGARDING FEDERALLY FUNDED RESEARCH OR DEVELOPMENT

The U.S. Government has certain rights in this invention pursuant to Grant No. ECS0239343 awarded by the National Science Foundation.

FIELD OF THE INVENTION

The invention relates to radio frequency circuits in general and particularly to a radio frequency circuit that can self heal.

BACKGROUND OF THE INVENTION

Process variations in the fabrication of integrated circuits lead to variations in the operating parameters or characteristics exhibited by multiple exemplars of the same circuit or device, including those made on the same fabrication line. These variations can result in divergent operation of what should be identical devices. One problem that this can create is the necessity to "trim" or adjust circuits to achieve acceptable operation. In the worst of cases, the variation can result in the need to reject or to discard chips that fall outside a desired operational envelope.

There is a need for systems and methods that allow circuits and devices that exhibit divergent operating parameters or characteristics to "self heal" or to self correct when such divergent operating parameters or characteristics are present.

SUMMARY OF THE INVENTION

According to one aspect, the invention features a self-healing integrated circuit system. The self-healing integrated circuit system, comprises: an integrated circuit comprising at least a first plurality of nominally identical circuit blocks each configured to perform an operation in response to an input signal and to provide a response signal, the at least a first plurality of nominally identical circuit blocks each having a respective at least one input terminal and having a respective at least one output terminal; a measurement module configured to measure a respective response to a test signal applied to of each of at least two of the at least a first plurality of nominally identical circuit blocks, each of the respective responses indicative of at least one parameter or characteristic of the respective one of the at least two of the at least a first plurality of nominally identical circuit blocks, the measurement module configured to be placed in electrical communication with each of the at least two of the at least a first plurality of nominally identical circuit blocks during a test duration, the measurement module configured to provide the test signal and to provide as data the respective responses; an analysis module configured to receive as input the respective responses, configured to analyze the respective responses to extract information indicative of the respective at least one parameter or characteristic of each of the at least two of the at least a first plurality of nominally identical circuit blocks, and configured to make a determination whether a corrective action is to be applied to any of the respective ones of the at least two of the at least a first plurality of nominally identical circuit blocks, the analysis module having at least one output at which the determination is provided as a signal; and a correction module configured to receive the determination as input and to apply the respective corrective action to each of the at least two of the at least a first plurality of nominally identical circuit blocks.

In one embodiment, the integrated circuit is a radio receiver.

In another embodiment, the measurement module is configured to isolate each of the at least two of the at least a first plurality of nominally identical circuit blocks during the test duration.

In yet another embodiment, the at least one parameter or characteristic is a frequency response.

In still another embodiment, the at least one parameter or characteristic is an I/Q mismatch.

In a further embodiment, the at least one parameter or characteristic is an absolute gain variation.

In yet a further embodiment, the at least one parameter or characteristic is a generated phase relationship between two signals.

In an additional embodiment, the at least one parameter or characteristic is an array peak to null ratio.

In one more embodiment, the at least one parameter or characteristic is a spurious frequency tone that is to be removed.

In still a further embodiment, all of the integrated circuit, the measurement module, the analysis module, and the correction module are integrated on a single substrate.

According to another aspect, the invention relates to a method of self-healing an integrated circuit. The method comprises the steps of: providing an self-healing integrated circuit system, comprising: an integrated circuit comprising at least a first plurality of nominally identical circuit blocks; a measurement module; an analysis module; and a correction module; measuring a respective response to a test signal applied to of each of at least two of the at least a first plurality of nominally identical circuit blocks, each of the respective responses indicative of at least one parameter or characteristic of the respective one of the at least two of the at least a first plurality of nominally identical circuit blocks; analyzing the respective responses to extract information indicative of the respective at least one parameter or characteristic of each of the at least two of the at least a first plurality of nominally identical circuit blocks; determining whether a corrective action is to be applied to any of the respective ones of the at least two of the at least a first plurality of nominally identical circuit blocks; and applying the respective corrective action to each of the at least two of the at least a first plurality of nominally identical circuit blocks.

In one embodiment, the method further comprises the optional steps of repeating the measuring, analyzing and determining steps to observe an effect of the applied respective corrective actions.

In another embodiment, the measuring step is applied to each of the at least two of the at least a first plurality of nominally identical circuit blocks in a sequential procedure.

In yet another embodiment, the measuring step is applied to each of the at least two of the at least a first plurality of nominally identical circuit blocks in a parallel procedure.

In still another embodiment, all of the integrated circuit, the measurement module, the analysis module, and the correction module are integrated on a single substrate.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4A is a circuit diagram of an illustrative RF source.

FIG. 4B is a graph showing the results of a Monte-Carlo simulation using the circuit of FIG. 4A. The output voltage variation driving a 50 fF load at 5 GHz is $\sigma$=0.22 dB, at 10 GHz is $\sigma$=0.23 dB, and 15 GHz is $\sigma$=0.20 dB.

FIG. 6A is a circuit diagram of an illustrative high-frequency MOSFET switch.

FIG. 6B is a graph showing the results of a Monte Carlo simulation of the voltage transfer function of a switch at 10 GHz. Simulation results show an average transfer gain of −0.15 dB with $\sigma$=0.02 dB.

FIG. 7A is a circuit diagram of an illustrative RF source.

FIG. 7B is a graph showing the results of a Monte Carlo simulation of: Monte Carlo simulation of a resistor-load common-source amplifier fabricated using the IBM 130 nm process. The average gain in the TSMC process is 15.36 dB with $\sigma$=0.30 dB.

FIG. 9A is a circuit diagram of an illustrative 10 GHz tuned amplifier.

FIG. 9B is a graph showing the results of a Monte Carlo simulation of the 10 GHz tuned amplifier fabricated using the IBM 130 nm process. The amplifiers in IBM 130 nm process use MIM capacitors.

FIG. 10B is a graph showing the results of a Monte Carlo simulation of the three stage 10 GHz tuned amplifier fabricated using the IBM 130 nm process.

FIG. 10C is a graph showing the results of a Monte Carlo simulation of the three stage 10 GHz tuned amplifier fabricated using the UMC 65 nm process.

Unless otherwise explicitly stated, the following acronyms used in this document have the meanings given below:
LO: local oscillator
VGA: variable gain amplifier
PVT: process-voltage-temperature
CMOS: complementary metal-oxide semiconductor
I/Q: in-phase/quadrature-phase
LCAMRFC: low-cost advanced multi-function radio-frequency concept (the name of a previous research program funded by DARPA/Office of Naval Research
IBM8RF: A specific process technology offered by IBM Corporation
RF: radio-frequency
PNR: peak-to-null-ratio
i.i.d.: independent identically distributed
HEALICS: the name of a DARPA program (not an acronym, just HEALing and ICs together,
IC—integrated circuit)
RSSI: received signal-strength indicator/indication

DETAILED DESCRIPTION

Major phased-array receiver signal path parameters can be categorized into two parts. The first is related to the dynamic range (DR) of the circuit or device, which includes conversion gain, linearity, noise figure, return loss, and I-Q mismatch. A second part is spurious responses related, which includes such phenomena as signal leakages from LO sources, interference from adjacent channels, and harmonic mixing. Spurious response-related parameters are an indicator of the quality of the system-level design, or layout, and are only loosely connected to process variations. Only DR related parameters are considered here.

Figure 1:
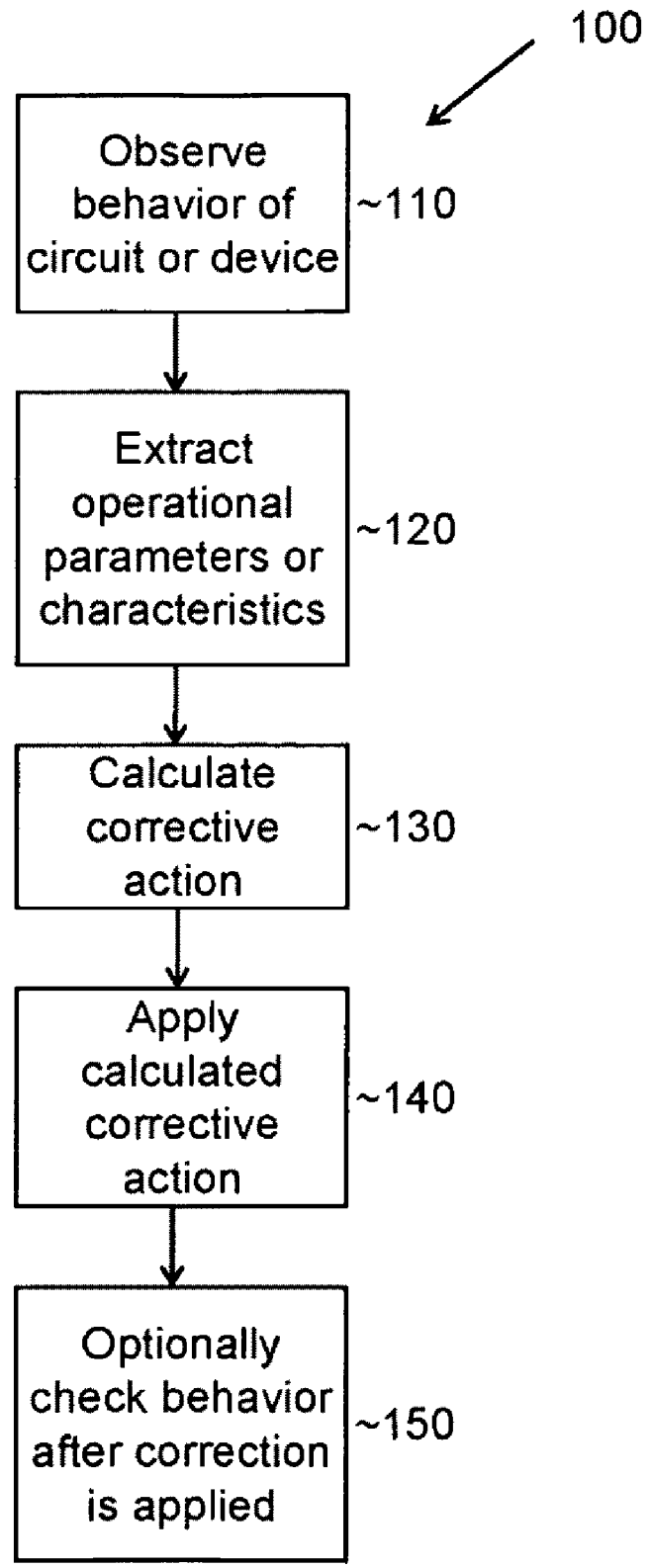
FIG. 1 is a schematic flow chart showing the overall system and process for a self-healing circuit or device.

FIG. 1 is a schematic flow chart 100 showing the overall system and process for a self-healing circuit or device. As illustrated in FIG. 1, at step 110, the behavior of a circuit or a device in response to an input signal is observed. This observation can be performed by components on the chip, or by components off the chip. At step 120, one extracts or derives one or more operational parameters or characteristics of the circuit or the device. At step 130, one calculates a corrective action, if needed, to bring the operational parameters or characteristics of the circuit or device within a desired range. The corrective action can be the application of a correction signal or a modification of one or more parameters or characteristics of an element in the circuit. At step 140, one applies the calculated corrective action, if needed, to bring the operational parameters or characteristics of the circuit or device within the desired range. Optionally, at step 150, one checks the operational parameters or characteristics of the circuit or the device after the correction is effectuated.

Figure 2:
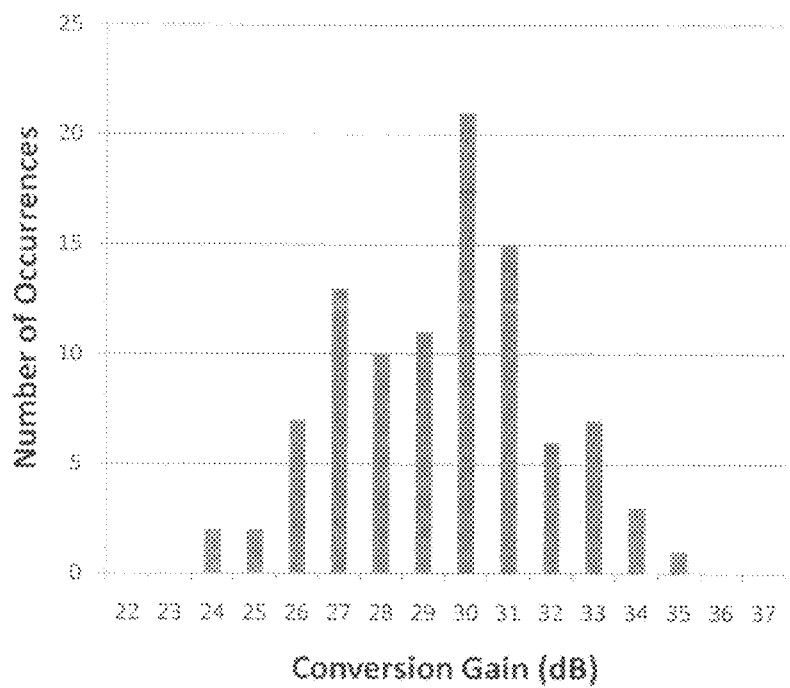
FIG. 2 is a graph showing the results of a Monte Carlo simulation of signal path conversion gain. Conversion gain variations are results of frequency variation of the tuned amplifier, all amplifier stages and mixers. Simulation results show average gain $\bar{\mu}_A$=28.9 dB with standard deviation $\sigma$=2.4 dB.

All dynamic range-related parameters can be directly derived, or indirectly related to the conversion gain measurement, and show noticeable variations in chips fabricated using nanometer processes. FIG. 2 shows a Monte Carlo simulation result for 100 repetitions of a calculation of the signal path conversion gain in the LCAMRFC project with the default internal settings. Conversion gain variations are results of frequency variation of the tuned amplifier, including all amplifier stages and mixers. Simulation results show an average gain $\bar{\mu}_A=28.9$ dB and a standard deviation $\sigma=2.4$ dB. A conversion gain variation with such range in a phased-array element would be expected to seriously affect the peak-to-null ratio of the phased-array system. An N-element phased array receiver built from phased-array elements with an average conversion gain A and gain variance of $\sigma_A^2$ would have a peak to null power ration to be $$\frac{NA^2}{\sigma_A^2}.$$

Thus, a 100-element phased-array built from the un-calibrated receiver elements having the gain and standard deviation parameters given above will be expected to have an average peak-to-ratio of 21 dB. It is to be expected that self-healing the conversion gain variations to less than 0.5 dB can greatly improve the array peak-to-ratio by more than 10 dB.

First Embodiment

Figure 3:
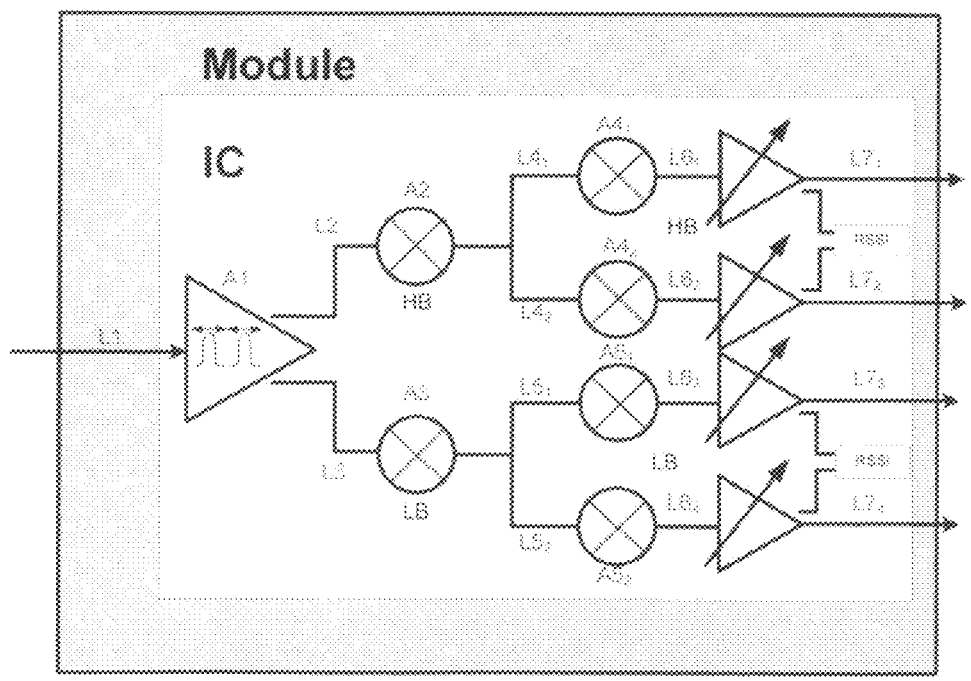
FIG. 3 is a schematic diagram that illustrates various sources of conversion gain variation.

FIG. 3 shows the sources of variations that appeared in the LCAMRFC receiver. Three kinds of conversion gain variation can be identified. The first are frequency variation of the frontend tuned amplifier $A_1(f)$, in which the peak frequency of the tuned amplifier changes chip by chip. The second kind of gain variations are the relative gain mismatch between symmetrical path, i.e., I-Q mismatch among the symmetric pairs: ($L4_1$, $L4_2$), ($L5_1$, $L5_2$), ($L6_1$, $L6_2$), ($L6_3$, $L6_4$), ($L7_1$, $L7_2$), and ($L7_3$, $L7_4$). The third kind of variation is the absolute gain variation across different chips or modules in different wafers. These are the gain or loss variations associated with each block or interconnection L1, A1, L2, A2, L3, A3, L4, A4, L5, A5, L6, and L7 as illustrated in FIG. 3. Table 1 lists the parameters and their respective meanings.

TABLE 1

| | |
|---|---|
| L1 | Input assembly/matching variations |
| A1 | LNA gain variations |
| L2, L3 | Path loss variations between LNA and RF mixer |
| A2, A3 | RF mixer conversion gain variations |
| L4, L5 | Path loss variations between RF and IF mixer |
| A4, A5 | IF mixer conversion gain variations |
| L6, L7 | Path loss variations of the output assembly/matching. |

To be able to self-heal the conversion gain variations discussed above, it is advantageous to have at least one internal signal generator, the design of which should be insensitive to process variations. DC reference voltages can be generated very precisely in modern designs and processes. In addition, frequency reference signals can be routed across a chip and are expected to remain intact or undeviated. FIG. 4A shows one preferred embodiment of an implementation of these kinds of process invariant RF sources, where the input signal is a large signal RF signal at a precise frequency $f_{source}$, and the signal amplitude does not need to be precise, as long as the signal power is large enough to switch the transistor M1 between ON and OFF states. The bias voltages VB1 and VB2 are generated from on-chip voltage references. Monte Carlo simulation of the RF source generator illustrated in FIG. 4B shows a maximum output voltage standard deviation of 0.23 dB.

Figure 5:
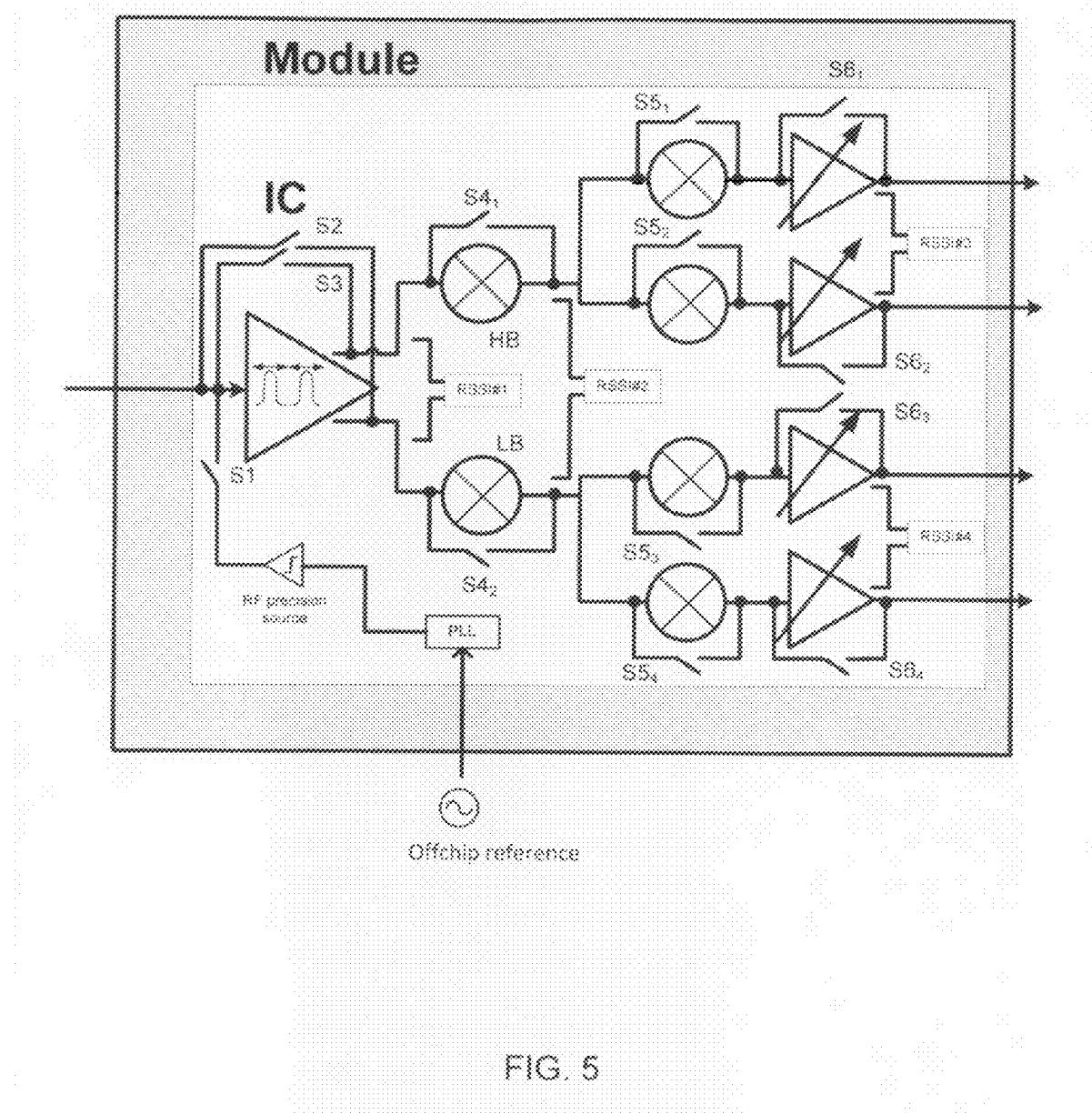
FIG. 5 is a schematic diagram of an embodiment of a self-healing receiver based on the circuit of FIG. 3 with the addition of a precision RF source, switches and RSSIs. The RF precision source can use the same phase locked loop (PLL) as the LO.

FIG. 5 is a diagram that illustrates a preferred embodiment of a self-healing receiver architecture. In FIG. 5, there are shown a precision RF source, bypass switches (S1, S2, S3, S4$_1$, S4$_2$, S5$_{1-4}$, and S6$_{1-4}$), and several received signal strength indicators ("RSSI"s).

We now describe the operative steps that can be used to calibrate the three types of variations.

1. Frequency Variation of the Tuned Amplifier
   a. Turn off the tuned amplifier, close S1, S2, and operate RSSI#1 to calibrate the frequency response of RSSI#1.
   b. Turn on the tuned amplifier, and open S1,S2
      i. For each RF signal source frequency $f_{RF}$
         1. Sweep the tuned amplifier's band setting.
         2. Measure the output of RSSI#1,
         3. Compare the current results to the previously recorded maximum value for RSSI#1;
         4. if the current results are larger that the recorded maximum, record the current band setting and RSSI#1 output value; otherwise, ignore the results.

In this way, one can measure the frequency variations of the tuned amplifier, and one can determine the correct band-setting of the tuned amplifier for the given RF signal at all $f_{RF}$.

2. I-Q Mismatch
   a. Close all the switches other than S1. Apply RF signal source $f_{RF}$ to the tuned amplifier input, and set the tuned amplifier to the correct band-setting. Turn on all blocks on the signal paths.
   b. For each RF signal source $f_{RF}$.
      i. Compare the I&Q gain mismatch between RSSI#3 and RSSI#4.
      ii. Based on the RSSI#3 and RSSI#4 measurement results, increment or decrement the corresponding VGA setting.
      iii. Re-measure the RSSI#3 and RSSI#4 output until I&Q mismatch is within a pre-defined measurement error.
      iv. Record the setting, and continue to the next $f_{RF}$ 3. Absolute Gain Variation To measure the absolute gain, one should determine the voltage transfer function variation introduced by the high-frequency switches (S1, S2, S3, S4$_1$, S4$_2$, S5$_{1-4}$, and S6$_{1-4}$) in FIG. 5. A high-frequency MOSFET switch is shown in FIG. 6A. The Monte Carlo simulation of the voltage transfer function of the high-frequency MOSFET switch is shown in FIG. 6B, which has an average voltage transfer gain of −0.15 dB with σ=0.02 dB standard deviation. In other words, the high-frequency switch introduces a negligible variation as compared to the RF sources, and the other blocks. Thus, for each gain block, one can apply the following procedure to measure the gain variation.

Gain Variation Measurement
   a. Turn off the gain block under test, and close the associated bypass switch. Calibrate the associated RSSI with different RF frequencies.
   b. Open the switch, and turn on the gain block. Measure the output of the associated RSSI at the different RF frequencies.
   c. Repeat the process for other blocks.

The bypass switches introduce negligible process variation. The variation of the high frequency RF sources has a maximum standard deviation of σ=0.23 dB. The overall absolute signal path conversion gain can be calibrated into a standard deviation comparable to the RF precision sources.

FIG. 7A is a circuit diagram of an illustrative RF source.

FIG. 7B is a graph showing the results of a Monte Carlo simulation of a resistor-load common-source amplifier fabricated using the IBM 130 nm process. The average gain in the TSMC process is 15.36 dB with σ=0.30 dB.

Figure 8:
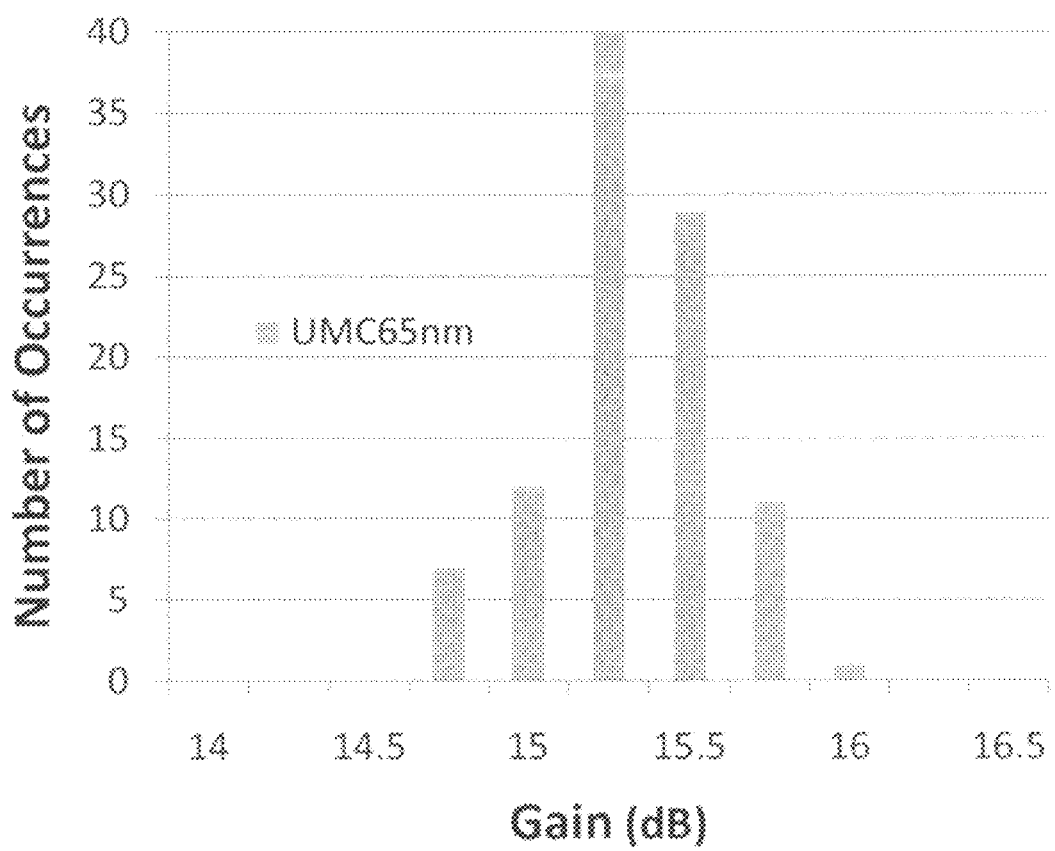
FIG. 8 is a graph showing the results of a Monte Carlo simulation of: a resistor-load common-source amplifier fabricated using the UMC 65 nm process. The average gain in the UMC process is 15.2 dB with $\sigma$=0.26 dB.

FIG. 8 is a graph showing the results of a Monte Carlo simulation of a resistor-load common-source amplifier fabricated using the UMC 65 nm process. The average gain in the UMC process is 15.2 dB with σ=0.26 dB.

Table 2 gives a summary of parameters obtained in simulations of various amplifiers fabricated using the IBM and the UMC processes.

FIG. 9A is a circuit diagram of an illustrative 10 GHz tuned amplifier.

FIG. 9B is a graph showing the results of a Monte Carlo simulation of the 10 GHz tuned amplifier fabricated using the IBM 130 nm process. The amplifiers in IBM 130 nm process use MIM capacitors.

Figure 9C:
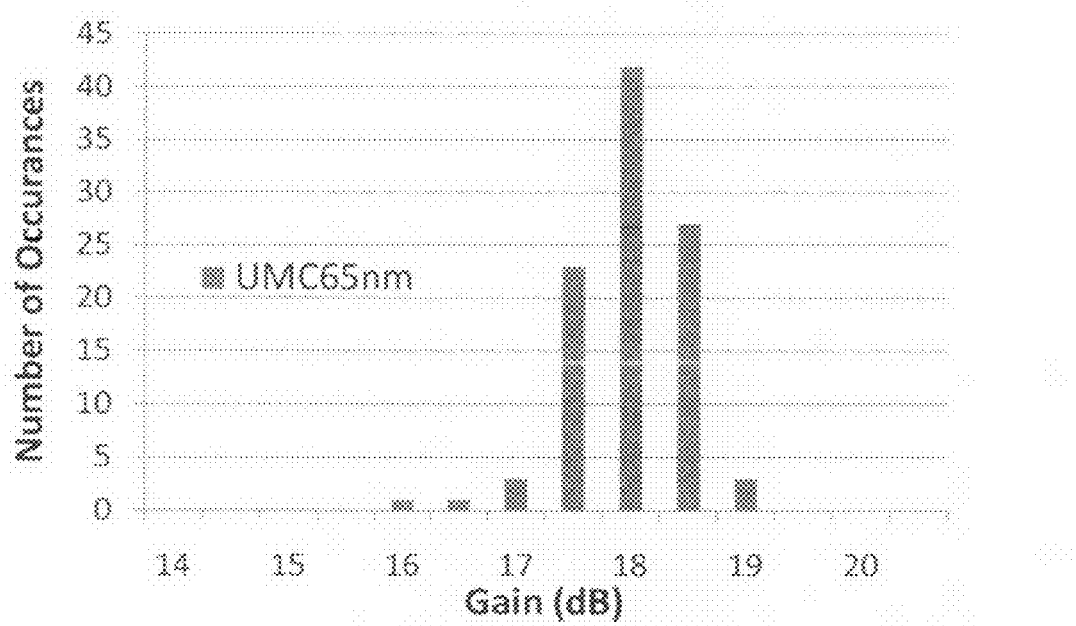
FIG. 9C is a graph showing the results of a Monte Carlo simulation of the 10 GHz tuned amplifier fabricated using the UMC 65 nm process. The amplifiers in the UMC65 nm process use MOM capacitors.

FIG. 9C is a graph showing the results of a Monte Carlo simulation of the 10 GHz tuned amplifier fabricated using the UMC 65 nm process. The amplifiers in the UMC65 nm process use MOM capacitors.

Figure 10A:
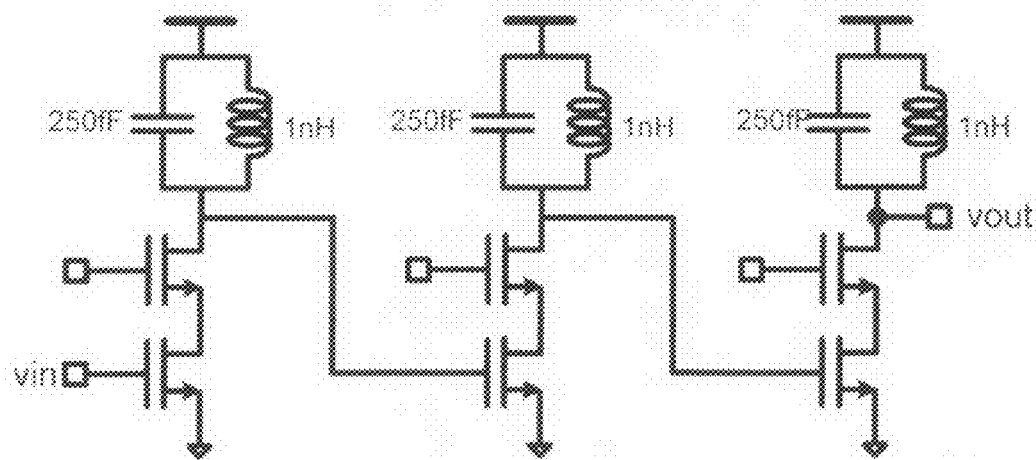
FIG. 10A is a circuit diagram of an illustrative three stage 10 GHz tuned amplifier.

FIG. 10A is a circuit diagram of an illustrative three stage 10 GHz tuned amplifier.

FIG. 10B is a graph showing the results of a Monte Carlo simulation of the three stage 10 GHz tuned amplifier fabricated using the IBM 130 nm process.

FIG. 10C is a graph showing the results of a Monte Carlo simulation of the three stage 10 GHz tuned amplifier fabricated using the UMC 65 nm process.

Second Embodiment

Precise phase generation is essential for high performance phased array systems, since the phase relations largely determine the beam-forming quality of the array. The phase rotator building block is used to generate the desired phase in the array element by combining the quadrature LO signals which are separately scaled by programmable variable gain amplifiers (VGAs). Although accurate phase generation implementation is first-order process-voltage-temperature (P.V.T.) insensitive, it is subject to mismatches and to P.V.T. gradient effect. Moreover, this effect will be exacerbated when the array element is implemented using a deep sub-micron CMOS process, e.g., a 65 nm CMOS process.

Figure 11:
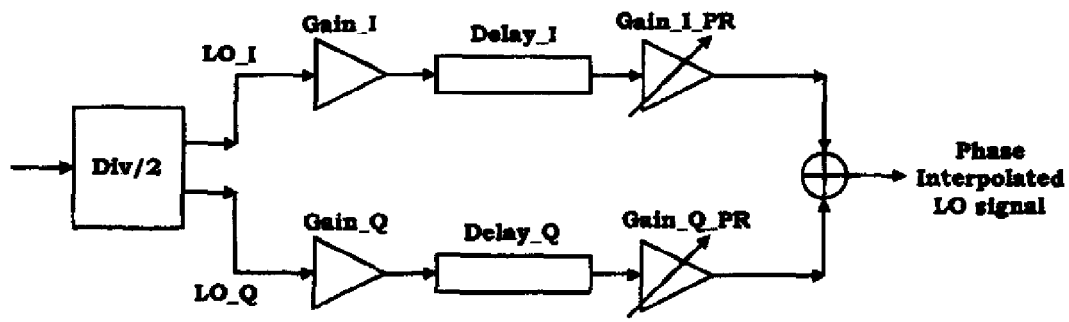
FIG. 11 is a schematic diagram illustrating four major sources of mismatch during phase synthesis.
Figure 12A:
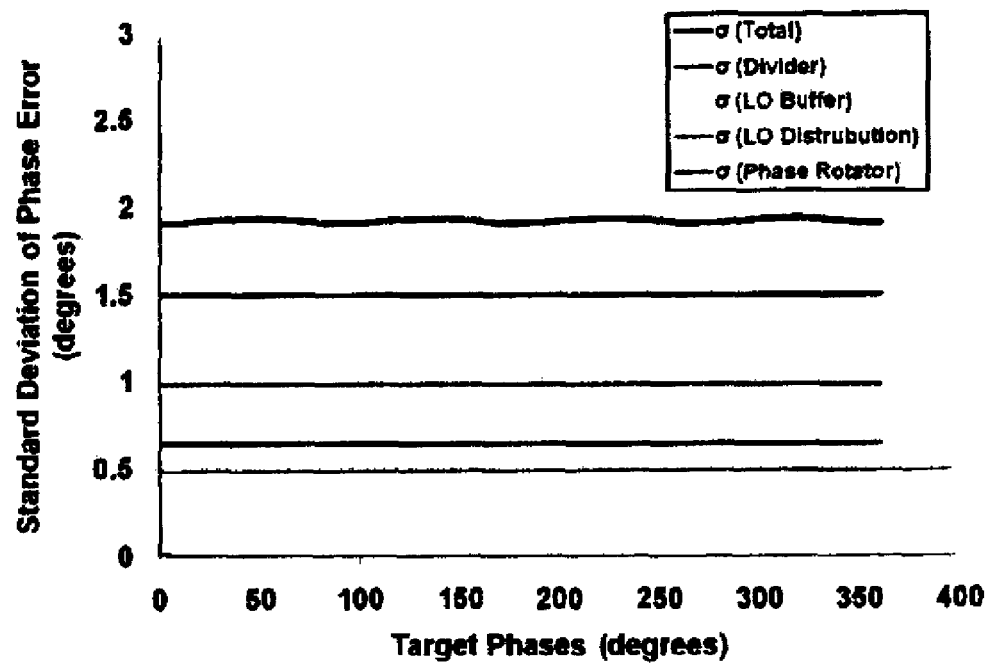
FIG. 12A is a diagram illustrating simulated Standard Deviation of Phase Error (degrees).

There are four major sources of mismatches which affect the phase generation: frequency divider output I/Q imbalance (phase), LO buffer chain (amplitude), LO distribution network (delay), and phase rotator VGAs (amplitude), shown in FIG. 11. Results of Monte-Carlo simulation (200 samples), based on LCAMRFC concurrent dual-band quad-beam CMOS phased array receiver chip have been summarized in FIG. 12A, where the IBM8RF 130 nm CMOS process mismatch model is used. Therefore, with the specification of random phase error to be 1, the baseline yield will be 37%. This mismatching phase errors will be exacerbated if the system is implemented using a deep sub-micron process.

Figure 12B:
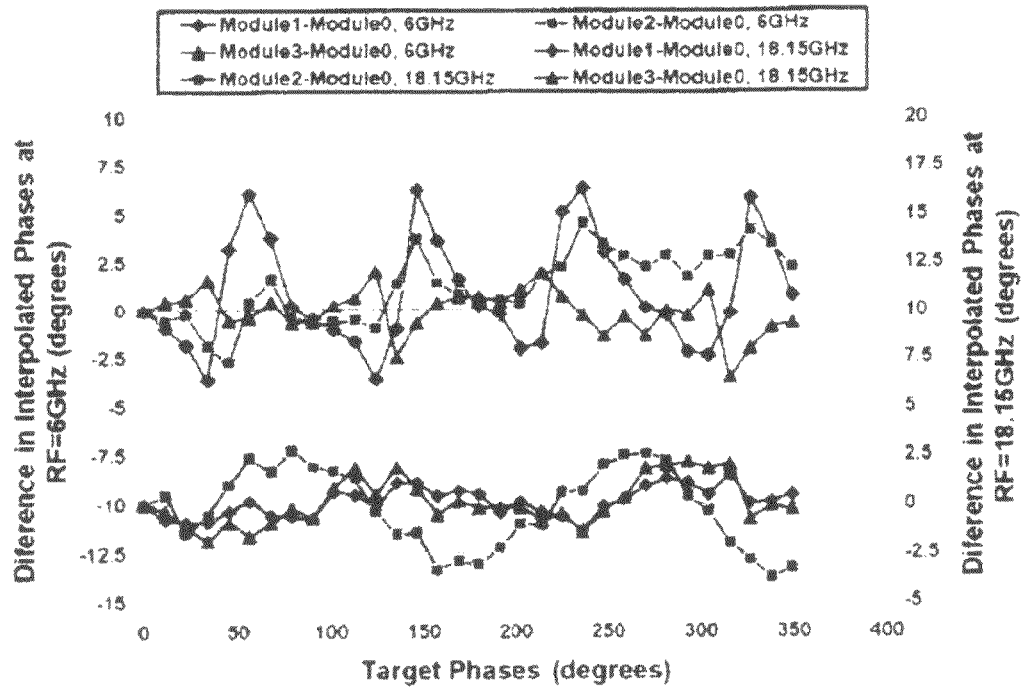
FIG. 12B is a diagram illustrating the measured Radom Phase Errors at RF=6 GHz and RF=18 GHz respectively (degrees)

FIG. 12B shows the measured random phase error for four testing modules based on the CMOS phased array receiver chip. For each target phase, the same digital setting is programmed for all the four modules. Their interpolated phase is measured and the output phase of the module 0 is used as the phase reference. For the case when RF=18 GHz, the measured phase errors can be well-explained by our simulation, while the RF=6 GHz case seems to experience a large random phase deviation. At RF=6 GHz, the phase errors are mainly generated by zero crossing distortion effects on the LO signals. With a higher order low pass filter implemented in the LO path, the LO harmonics can be greatly suppressed, which will lead the phase error distribution closer to the case of RF=18 GHz.

Figure 13:
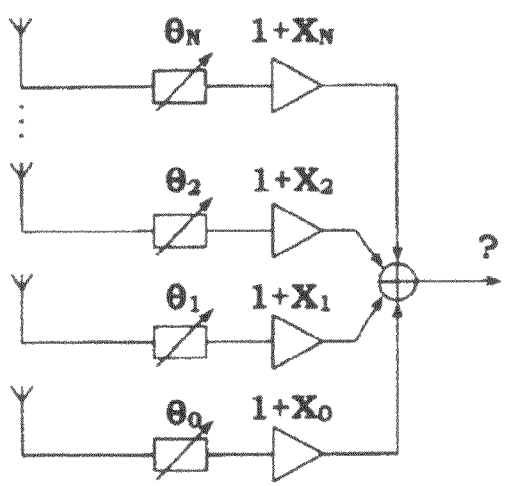
FIG. 13 is a diagram that illustrates how the array quality is affected by both random phase errors ($\theta_i$) and amplitude mismatches ($X_i$) among array elements.

In terms of array operation, not only the interpolated phase errors but also the gain mismatches between elements will affect the overall array quality, shown in FIG. 13. This array quality can be quantified as $$\text{Array Peak to Null Ratio(PNR)}=20 \log(\text{Amp}_{peak}/\text{Amp}_{null}).$$

The phase errors are mainly sensitive to mismatches within the element, while the amplitude errors are subject to both mismatches and absolute P.V.T. variations across the elements. We have assumed that the delays/attenuation mismatches in the signal feeding/combing network and clock skews in the reference distribution network can be fully determined and completely calibrated-out a priori.

With this PNR chosen as the array figure-of-merit, its statistical characteristics can be determined given the number of array elements and random phase/amplitude errors distributions.

Figure 14:
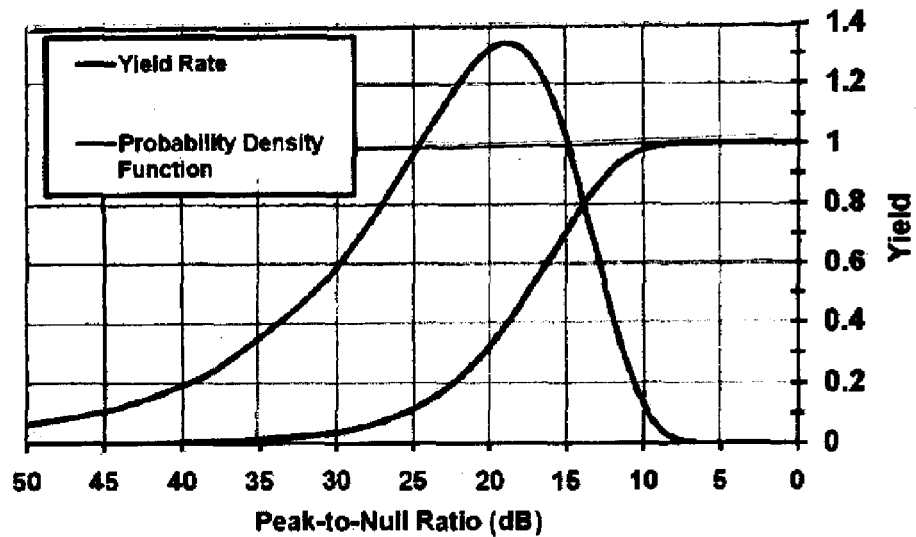
FIG. 14 is a diagram that illustrates the calculated yield rate and probability density function (PDF) of the array peak-to-null ratio (dB).

For example, if we assume an array with four elements with i.i.d phase errors of $N(0, \sigma_\theta=2.0°)$ and i.i.d amplitude mismatches of $N(0, \sigma_x=0.32)$ across the array elements, it can be shown that with small angle approximation, the null amplitude (at an incident phase difference of) 90° has a Rayleigh distribution. Therefore the probability density function (PDF) and the yield rate based on array PNR can be calculated and plotted in FIG. 14. If the array specification is PNR greater than 20 dB, the baseline yield will be only 32% when the array is subject to all the aforementioned random phase/amplitude errors.

Figure 15:
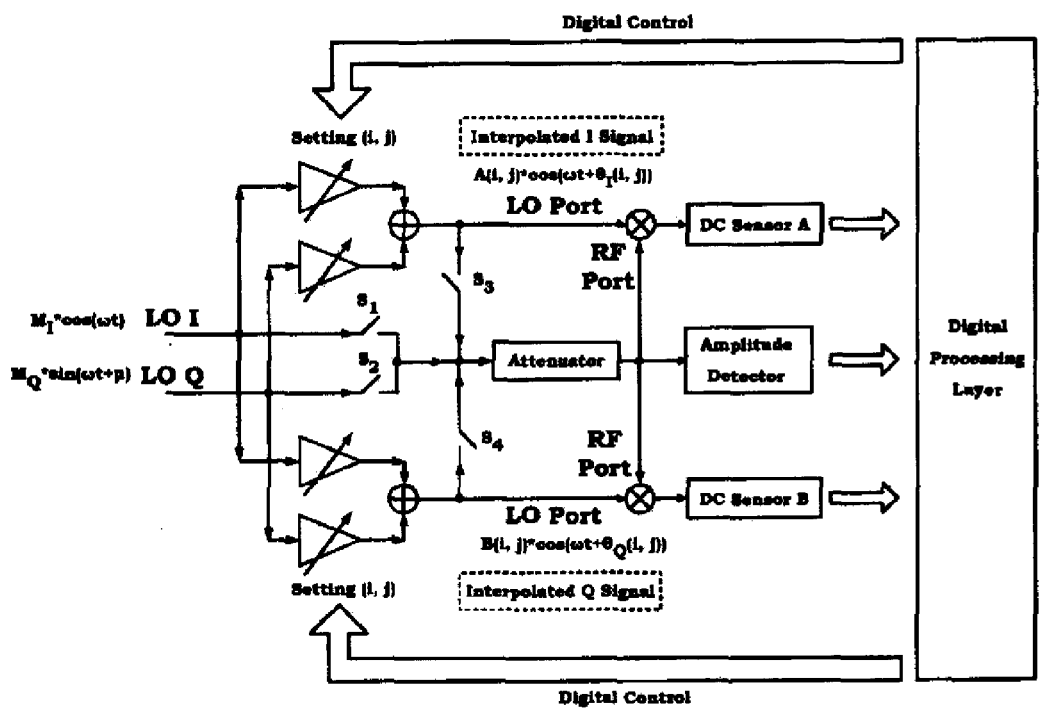
FIG. 15 is a schematic diagram of illustrative automatic phase/amplitude calibration circuitry in the HEALICS phased array system.

Therefore, an automatic phase/amplitude calibration circuitry can be used for the calibration of a large-scale phased array. FIG. 15 shows an illustrative block diagram.

The operation procedure of the automatic correction circuitry (Meters) is listed as follows:

Step 1: S1 is closed, while S2, S3 and S4 are open. The phase/amplitude (projected onto in-phase LO component) information of the interpolated signals can be obtained.

Step 2: S2 is closed, while S1, S3 and S4 are open. The phase/amplitude (projected onto quadrature LO component) information of the interpolated signals can be obtained.

Step 3: S3 is closed, while S1, S2, and S4 are open. The amplitude information of the interpolated I signal (the upper interpolation path) can be obtained.

Step 4: S4 is closed, while S1, S2, and S3 are open. The amplitude information of the interpolated Q signal (the lower interpolation path) can be obtained.

Thus, the complete phase/amplitude information of the interpolated signal can be derived and stored. Based on this information, an automatic procedure can be designed in digital layer to set the best-match digital settings (Knobs) of the phase interpolator to complete the corrections.

Third Embodiment

In one embodiment, the invention relates to detecting and removing undesired spurious frequency tones from phased-locked loop frequency synthesizers. Spurious tones are undesirable in a receiver because they allow signals at frequencies other than in the selected band to be down-converted and thus received without being able to distinguish between the desired signal and these undesired signals. In a transmitter, side-tones in the synthesizer appear at the antenna and are transmitted along with the desired signal, potentially interfering with other users. Typically, side-bands due to amplitude modulation (AM) can be easily removed by amplifying and limiting the amplitude of the synthesizer output. In contrast, side-bands due to frequency modulation are difficult to remove once introduced as they generally require detection and correction of minute timing differences between subsequent oscillator edge transitions. The present disclosure deals with detecting and removing such differences, and for the purpose of this disclosure, spurious frequency outputs will subsequently be understood to mean frequency-modulated spurious frequency outputs.

Spurious frequency response of the frequency-and-phase synthesizer is sensitive to PVT and mismatch variations, particularly in charge-pump based phased-locked loop implementations. In charge-pump PLLs (which are often preferred over multiplier based detector implementation due to their inherently better stability), the charge pump output is the difference of two charge depositions to and from an integrating capacitor by the "up"-(incoming reference phase transition) and "down"-signals (incoming VCO phase transition), respectively. Ideally, the charge deposited is a linear function of time with zero intercept and an equal magnitude but opposite sign for the "up"—and "down"-signals. The difference between the "up"—and "down"-signal, then, is a linear measure of the phase-difference.

Figure 16:
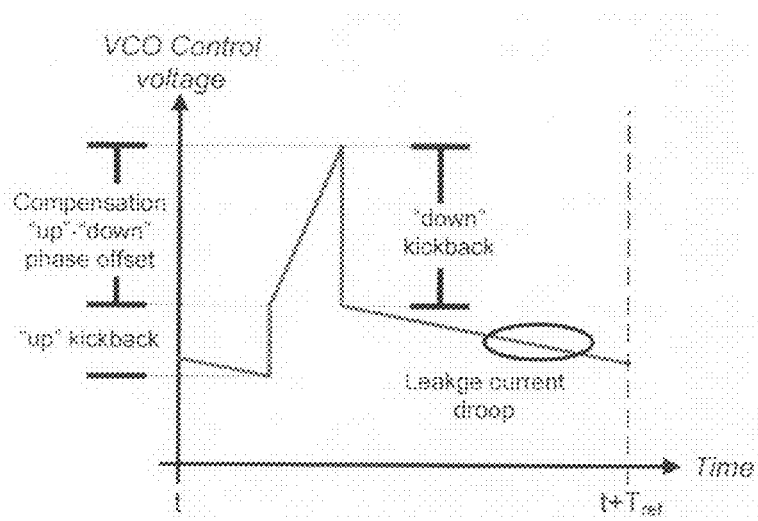
FIG. 16 is a graph illustrating a steady state control voltage waveform and indicating sources of spurious frequency output.

In real-world circuit implementations, however, this difference is corrupted from its ideal value of zero in steady-state mainly for two reasons: first, "kickback", i.e. charge flow through transistor capacitance(s) from the charge-pump inputs to the charge-pump output. If the net charge-difference between the "up" and "down" arm due to kickback is not zero, the loop has to compensate the difference. Secondly, leakage currents on the control voltage node lead to voltage droop. In both cases, the pump can compensate for these differences through a small phase-offset in steady state, which manifest themselves as spurious tones at the VCO output. The effect of these mechanisms on the control voltage waveform is illustrated in FIG. 16.

Some designers prefer to use loop-filter switches that isolate the charge pump and some part of the loop-filter from the loop-filter output (that is the VCO control voltage). These switches are activated during part of the reference cycle for which the charge-pump is not activated so that charge pump transient voltages and currents do not disturb the VCO control voltage. In this case, however, kick-back charge flow from the loop-filter switch to the VCO control voltage node can still produce transient voltages on the VCO control voltage nodes, producing spurious output tones. For the purpose of this discussion, both circuit configurations lead to similar results and are thus treated similarly.

In addition to spurious tones generated by control voltage transients, AM-to-PM (Phase Modulation) conversion in the oscillator itself or in subsequent non-limiting amplifying circuits can introduce spurious tones. Typically, great care is taken to ensure that AM supply variations leading to PM modulated output are kept at a minimum. In addition, these mechanisms are typically quite weak.

As spurious tone generating mechanisms are the result of parasitic or intrinsic effects (undesirable, yet unavoidable effects), the output spurious performance is sensitive to PVT variations and device mismatch because those variations and mismatches directly impact leakage currents and device capacitances. Therefore, spurious performance is ultimately caused by and dependent upon parasitic effects, which explains its variations to PVT and mismatch conditions.

To quantify the above described effects statistically, both PVT—as well as Monte-Carlo simulations were performed on a previously implemented synthesizer that is part of a 6-18 GHz broad-band receiver. PVT simulations indicate the strongest sensitivity of spurious output to the PFET corner and desired output voltage. The magnitude of spurious frequencies is less sensitive to temperature, charge pump current and NFET corner. This is expected because the PFETs used are generally larger than the NFETs (and hence have a higher amount of "kickback") and because temperature increases or decreases leakage currents into and out of the control voltage node in the same way.

Figure 17:
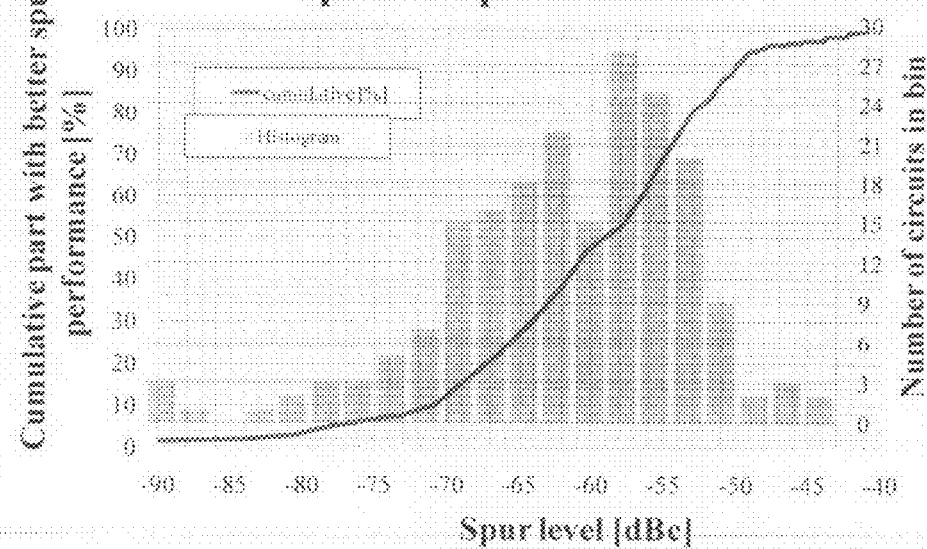
FIG. 17 is a graph showing the percentage yields for target spurious output levels in dBc using Monte-Carlo simulations of a previously designed broad-band frequency synthesizer. The yields are cumulative.

To study the effect of device mismatch and process variations, the output voltage ripple of the detector/charge pump combination is evaluated using Monte-Carlo simulations. For the purpose of this analysis, the base-line spurious performance is assumed to be ideal (i.e. no spurious component is present), and the effects of process variations and device mismatches on control voltage ripple is simulated. The output spurious tone level associated with this ripple is calculated from the appropriate Bessel functions and assuming a typical VCO gain of 1 GHz/V. FIG. 17 shows target maximum spur level on the x-axis and cumulative percentage of circuits achieving this target under the above variations. Note that variations in VCO gain and temperature would further decrease the cumulative yields.

Correcting the spurious frequency output using traditional means such as single feedback loops is difficult for several reasons. First, as a problem of actuation, the error signal is the largest of several spurious outputs, and, hence, reducing a single component (such as the spurious tone at the fundamental reference offset) will not reduce the error beyond the point where the next significant component becomes dominant. In reality, the charge-pump non-idealities cause an undesirable transient response as previously illustrated in FIG. 16, which should be compensated for maximum results. To compensate the effect of all of the non-ideal affects, it is desirable to have at least four pieces of information: the amount of charge to be added/subtracted, two points in time when to add/subtract this charge to offset the action of the charge-pump, and, finally, the overall amount of leakage current. Secondly, as a problem of detection it is desirable to keep the detection circuit as simple as possible to reduce circuit overhead and power consumption. However, since frequently the majority of spurious tones in a PLL synthesizer are caused by disturbances on the control voltage node, a detector detecting such disturbances only may be sufficient. We will discuss several kinds of detectors that employ different kinds of detection strategies in the following section.

Implementation

Spurious Tone Detection

Figure 18A:
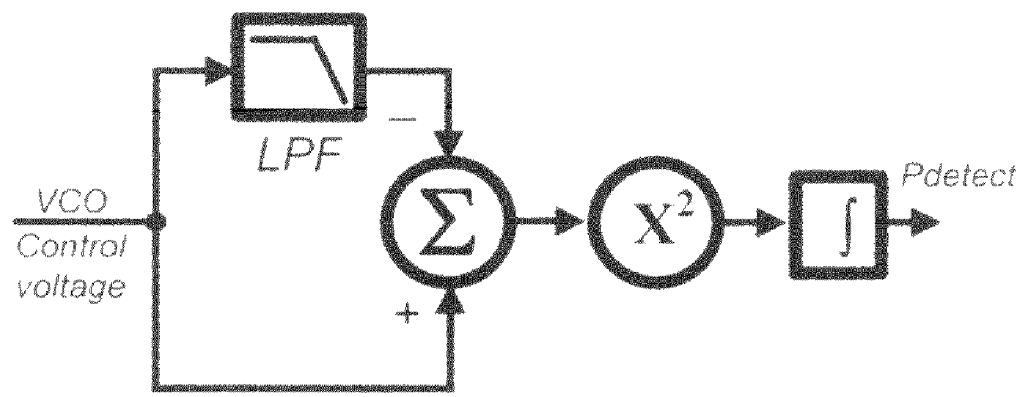
FIG. 18A is a schematic block diagram of a Spurious power detection block diagram using detection scheme 1. Total power is detected by integrating the AC power of the control voltage over an integer multiple of the reference clock cycle.
Figure 18B:
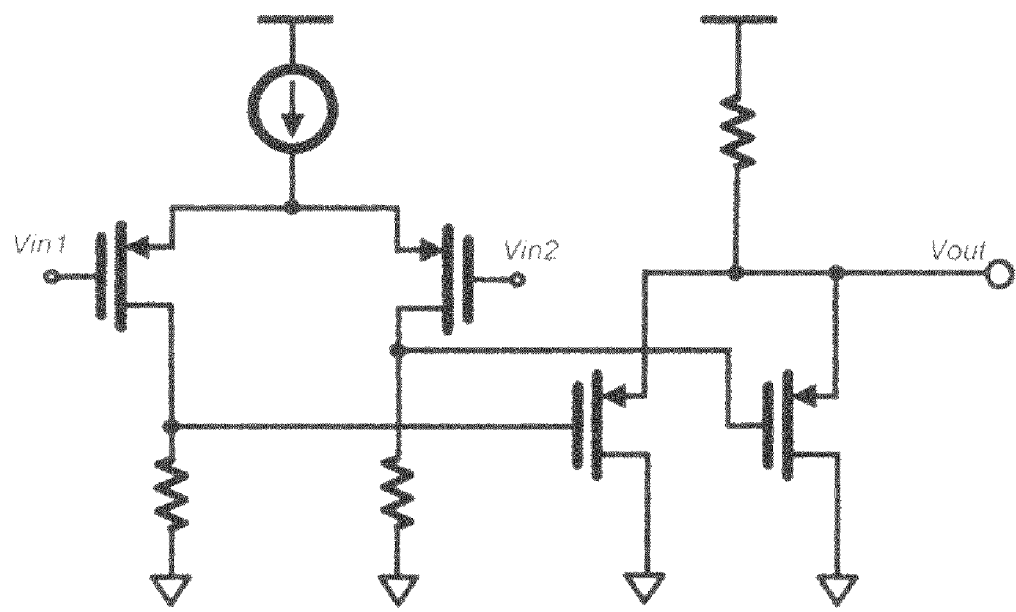
FIG. 18B is a diagram showing in simplified circuit detail a summing and squaring block.

As a result of the above considerations, we describe a self-healing approach that utilizes a digital backend run at low duty cycle to periodically correct the spurious frequency outputs rather than a traditional analog feedback approach. This backend utilizes a spurious output detector and one or more programmable charge injectors. For the detector, several possibilities exist. We start with a power detection scheme (scheme 1) that integrates over time the square of the difference between the control voltage and its DC value. FIG. 18A shows a block diagram for implementing this concept while FIG. 18B shows a simplified circuit implementation for the core summing- and squaring operations, where the square-law relationship between output current to input voltage in FETs is utilized to perform the squaring. The transient output voltage Vout can be integrated over time to obtain power and be read out by a digital backend.

This simple detector operates as follows: the incoming control voltage signal and a filtered version of it that only retains the DC component are subtracted from each other. The resulting signal contains only the AC component of the control voltage signal, which is the component relevant for generating spurious output tones. This signal is squared to obtain a measure for the instantaneous signal power (since when the instantaneous value at $t_1$ is $V[t_1]$, the instantaneous power is proportional to $(V[t_1])^2$). The instantaneous power values are integrated over the reference clock cycle, and the final output is a value proportional to the total power of all AC components in the control voltage signal.

While this simple detector can detect the total power of all spurious components caused by disturbances of the control voltage, it suffers from several short-comings. First and foremost, this simple detector only delivers net power, lumping together all spurious components independent of their frequency offset. In this way, a minimization process can only minimize total power. Secondly, information regarding relative phases and amplitudes of individual components before and after offset charge injection during actuation may provide useful additional information that may allow for faster and/or more accurate convergence in the correction process. In addition, it would allow objective functions other than total power minimization to be formulated.

Figure 19A:
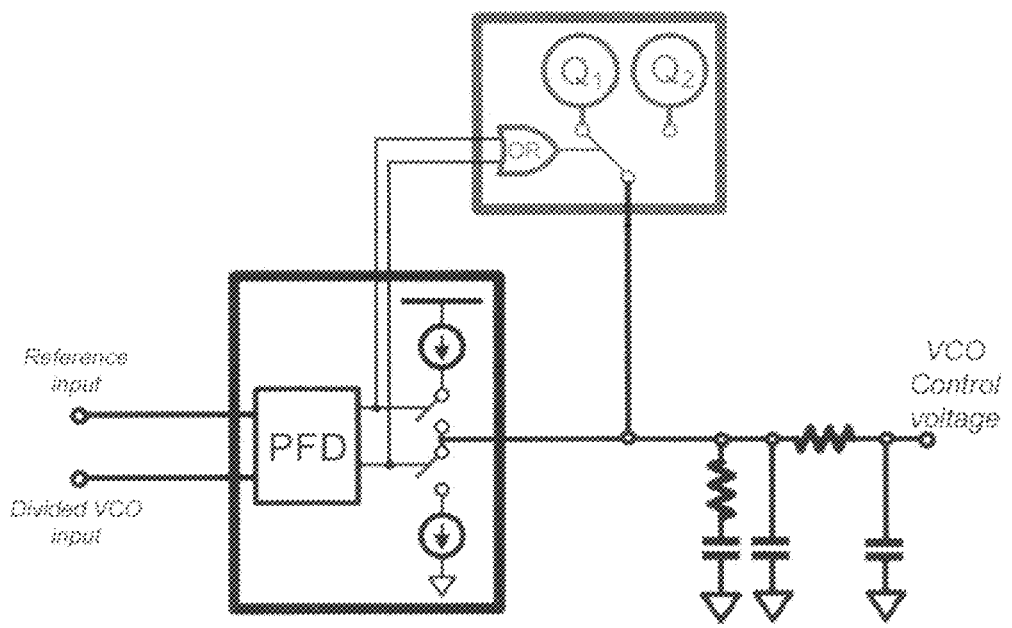
FIG. 19A is a circuit showing a PFD, a charge-pump, and a loop filter arrangement. A charge injection circuit has an OR gate and two charge injection sources $Q_1$ and $Q_2$.

FIG. 19A is a circuit showing a PFD, a charge-pump, and a loop filter arrangement. A charge injection circuit has an OR gate and two charge injection sources $Q_1$ and $Q_2$.

Figure 19B:
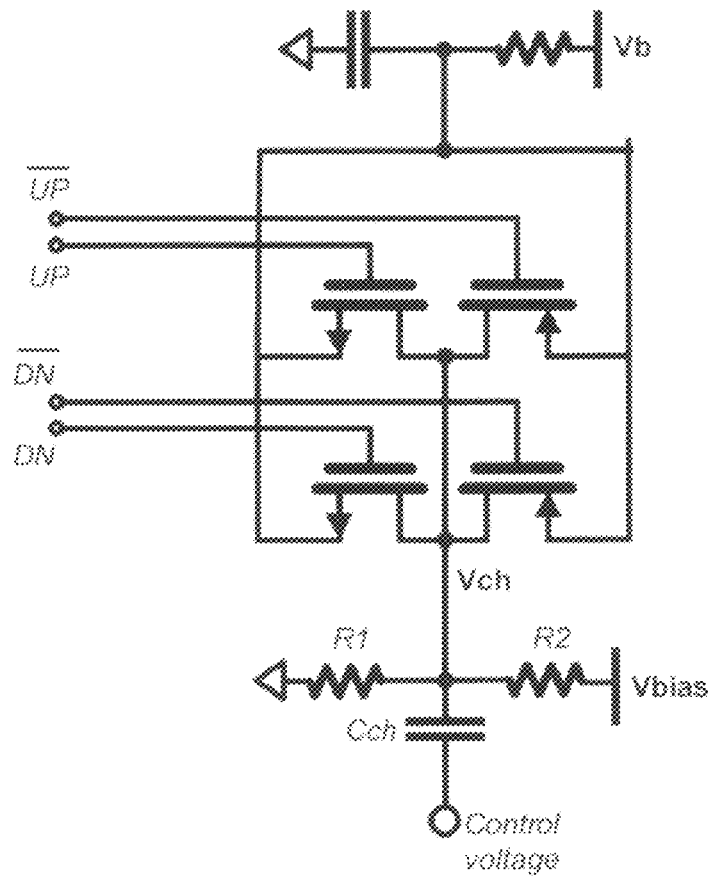
FIG. 19B is a schematic of a simulated charge-injection circuit shown in FIG. 19A. Each FET is implemented as two FETs in parallel with the same drain- and source connections using one of the two shown gate signals respectively.
Figure 19C:
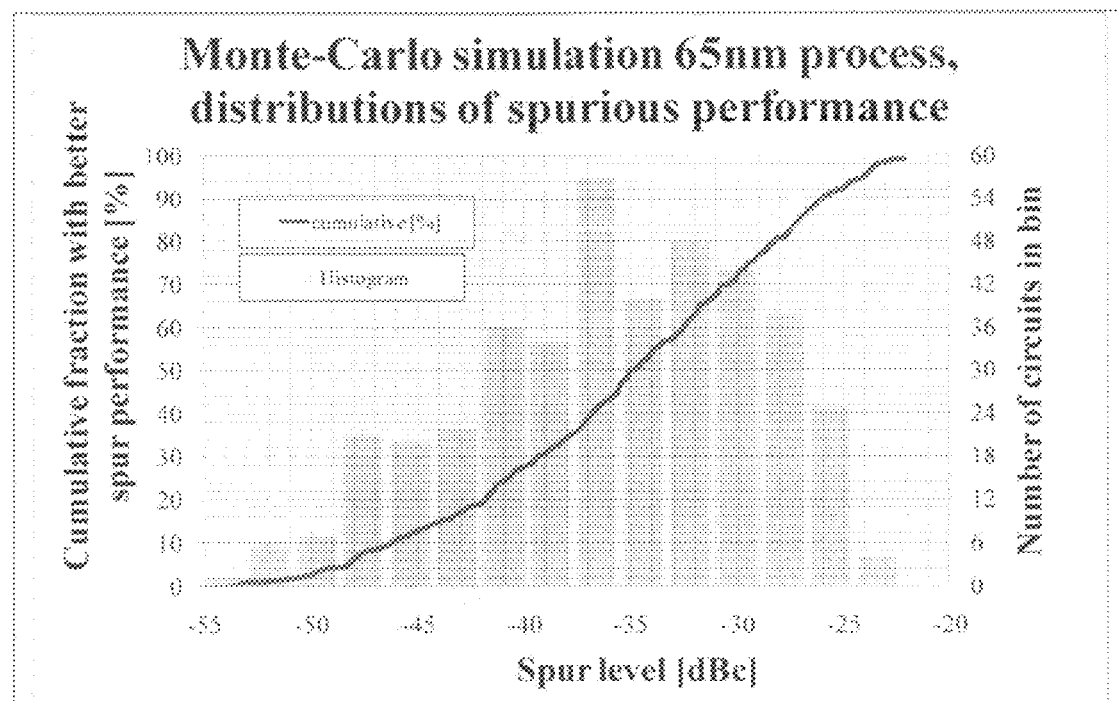
FIG. 19C is a graph showing the percentage yields for target spurious output levels in dBc using Monte-Carlo simulations of a tentative design in 65 nm. The yields are cumulative.

The schematic of the charge-injection circuit is shown in FIG. 19B. The circuit operates as follows: for most of a reference cycle, the FET switches are open, and Cch is charged to a voltage Vbias. As UP and DN start to rise (together in steady state) at least two of the four FETs will become active. The exact timing of activation with respect to the charge pump is set by Vb, the source voltage of both FETs, which can be set such that the injection circuit slightly precedes or follows the charge pump. Upon activation, the two capacitors are shorted and a charge proportional to the difference of Vb and Vbias (Vch) is pulled mostly through the capacitor Cch and the control voltage node. When UP and DN both have fallen, the FET switches open, and Cch is recharged through R1 and R2, drawing charge again through Cch and through the control voltage node. By setting Vb, Vbias and R1 and R2, the timing and magnitude of the two charge depositions onto the control voltage node can be controlled, allowing to mostly compensating for three of the four above mentioned mechanisms creating spurious components. Even with this rather rudimentary control, simulations indicate a reduction of baseline control voltage ripple of 400 uV to at most 15 uV in the high-VCO gain regions and to at most 45 uV at the edges of the control voltage region. This corresponds to output spurious tones of less than −60 dBc in both regimes, an improvement of more than 20 dB of the simulated and measured baseline of approximately around −35 dBc. Furthermore, the actuation reduces all spurious frequency outputs simultaneously, verifying the general concept.

An improved detection circuit (scheme 2) samples the control voltage at well-defined points during the division cycle. Using sufficiently narrow time-steps for sampling, the control voltage waveform can be resolved in the time-domain and phase- and amplitude information for components up to the Nyquist limit can be obtained. If the reference clock cycle has period T, and the control voltage waveform is sampled in N equal time-steps, such that the time difference between each sampling step is T/N, then all components of frequency less than $$\frac{N}{2T}$$

can be measured in amplitude and phase. Due to aliasing, components greater than $$\frac{N}{2T}$$

will "alias" back into the base range from zero frequency (DC) to a frequency of $$\frac{N}{2T}.$$

Aliasing can be minimized by band-pass filtering the control voltage. This scheme improves on the previous scheme in that the time domain shape of the control voltage signal is now available, allowing to obtain the value all AC frequency components in phase and amplitude independently, up to the Nyquist limit. The power of each component can be determined individually and optimized independently. Furthermore, during each correction step, information is obtained regarding the effect of the correction signal on each of the AC components independently.

Figure 20A:
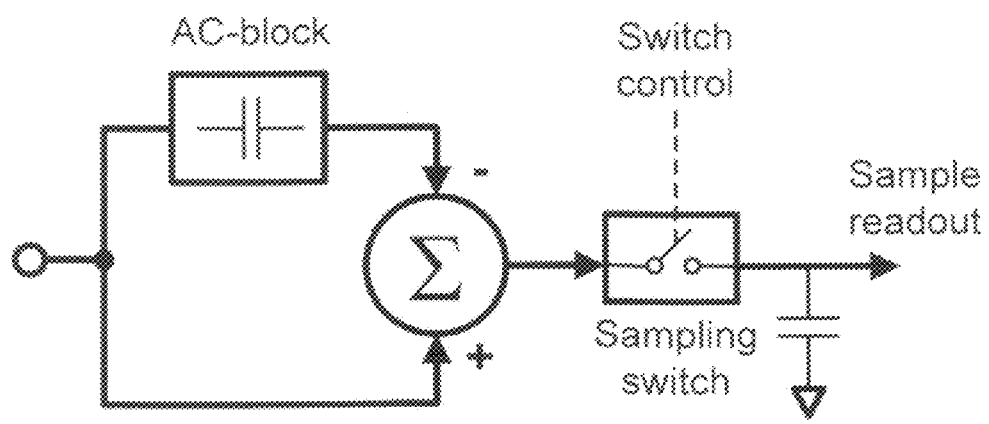
FIG. 20A is a schematic block diagram of a spurious power detection using detection scheme 2. The control voltage signal is sampled periodically at the same time-point during the reference cycle. The trigger timing for the sampling switch can be adjusted to fall within anywhere in the reference clock cycle (with desired resolution) to allow reconstruction of the time-domain shape of the oscillator control voltage.

FIG. 20A is a schematic block diagram of a spurious power detection using detection scheme 2. The control voltage signal is sampled periodically at the same time-point during the reference cycle. The trigger timing for the sampling switch can be adjusted to fall within anywhere in the reference clock cycle (with desired resolution) to allow reconstruction of the time-domain shape of the oscillator control voltage.

Similarly to the previous scheme, the DC component is removed. The signal is band-pass filtered to remove frequency components close to and in excess of the Nyquist frequency, minimizing problems with aliasing. The band-pass filtered version is sampled at time $T_0$, shown here using a sampling switch closed at $T_0$ and opened shortly thereafter followed by capacitor to hold the sample. The sample is then read out. By changing the timing occurrence of $T_0$ to $T_1$, $T_2, \ldots, T_n$ during the reference clock cycle, different times of the (periodic) control voltage waveform can be sampled, with resolution and accuracy only depending on the accuracy and resolution with which the timing of $T_n$ can be adjusted.

Because all signals involved are periodic, many samples at each time-step can be collected and averaged, reducing the noise power by a factor of $\sqrt{M}$ when M samples are averaged. In this way, using long-enough detection times (number of averages), even miniscule disturbances can be detected. Furthermore, the detection sensitivity can be adjusted during the correction cycle.

Details of the implementation can vary. For example, the signals and circuits can use single-ended or differential implementations. A sampling switch can be implemented using bipolar, FET or other devices suitable to implement switches capable of operation at the frequencies of interest. In one implementation, a double-mixer with the LO input operated as the switch input was used, with a differentially connected capacitor at the output to provide sample storage (the differential DC voltage difference being the sample). The sampled output can use additional low-pass filters and an ADC to convert the signal into a form appropriate for digital backend processing.

Figure 20B:
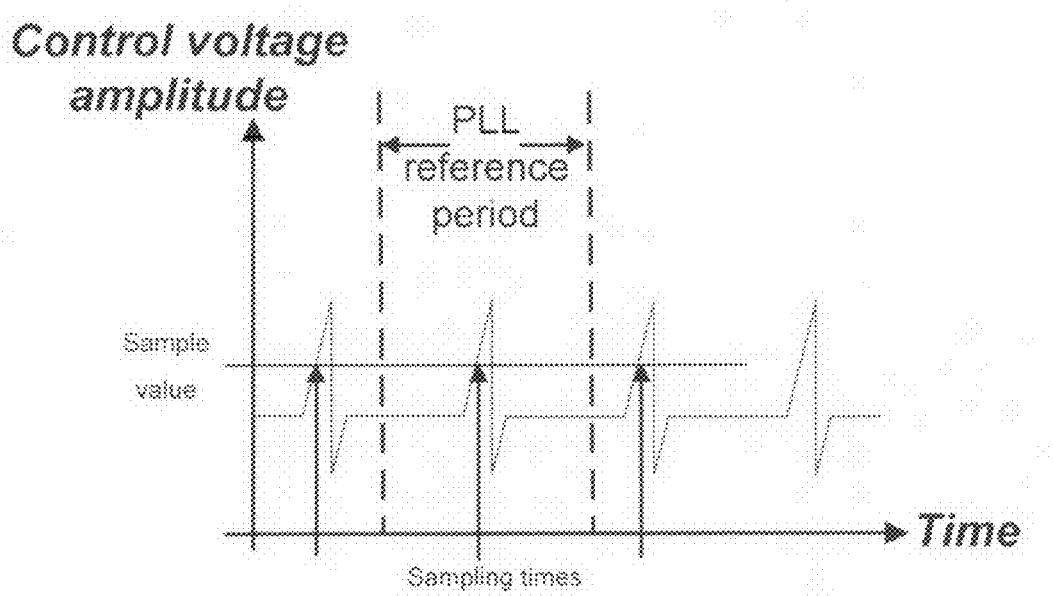
FIG. 20B is a graph showing a simplified plot of the sampled control voltage with periodic sampling at one time-point during a reference clock cycle.

FIG. 20B is a graph showing a simplified plot of the sampled control voltage with periodic sampling at one time-point during a reference clock cycle.

Figure 21:
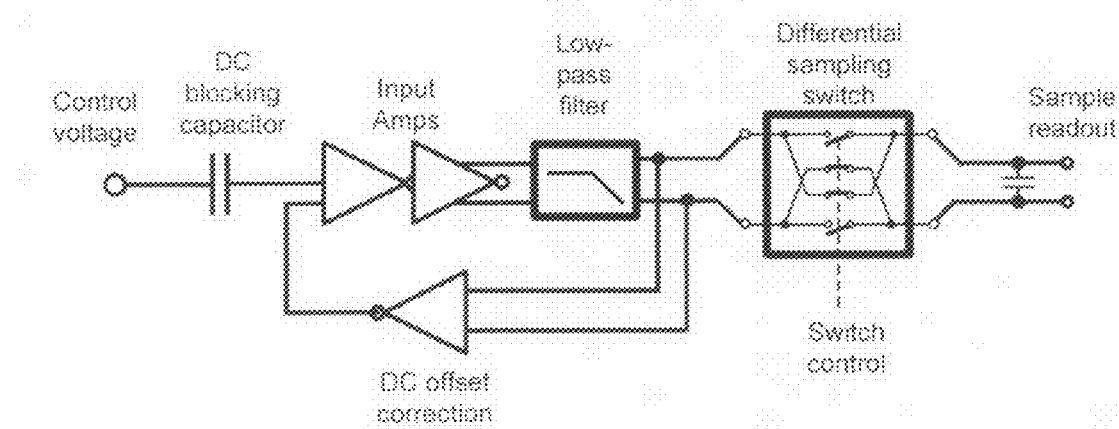
FIG. 21 is a schematic diagram of an illustrative implementation of a spurious detector using a control voltage sampling detection scheme.

FIG. 21 is a schematic diagram of an illustrative implementation of a spurious detector using a control voltage sampling detection scheme. FIG. 21 shows an embodiment using a DC blocking capacitor to remove the input DC component. Initial signal amplification and band-pass filtering is achieved using several differential amplification stages where the second input to the initial differential amplifier is a DC voltage to remove all DC offsets in a standard offset compensation loop. The bandwidth of this compensation loop will then set the lower bandwidth limit of the overall band-pass transfer function, and filters used (either explicitly or implicitly) can limit the band-pass response at the upper frequency limit.

The intermediate time-steps can be obtained in several ways. The most-straightforward way is to use state information from the PLL synthesizer itself since the PLL synthesizer typically contains a divider, counter or other state-machine that divides the VCO signal by an integer P and compares the phase of the divided signal to the phase of a reference frequency $f_{ref}$ such that phases align and the VCO frequency is $P \cdot f_{ref}$. Thus, there are P time states available during the reference period T, typically evenly spaced that can be used to sample the control voltage waveform at P different time points during the division cycle. It is also possible to multiply the reference frequency independently or to use a separate counter synchronized with the main counter to provide timing information to generate the sampling times.

Figure 22:
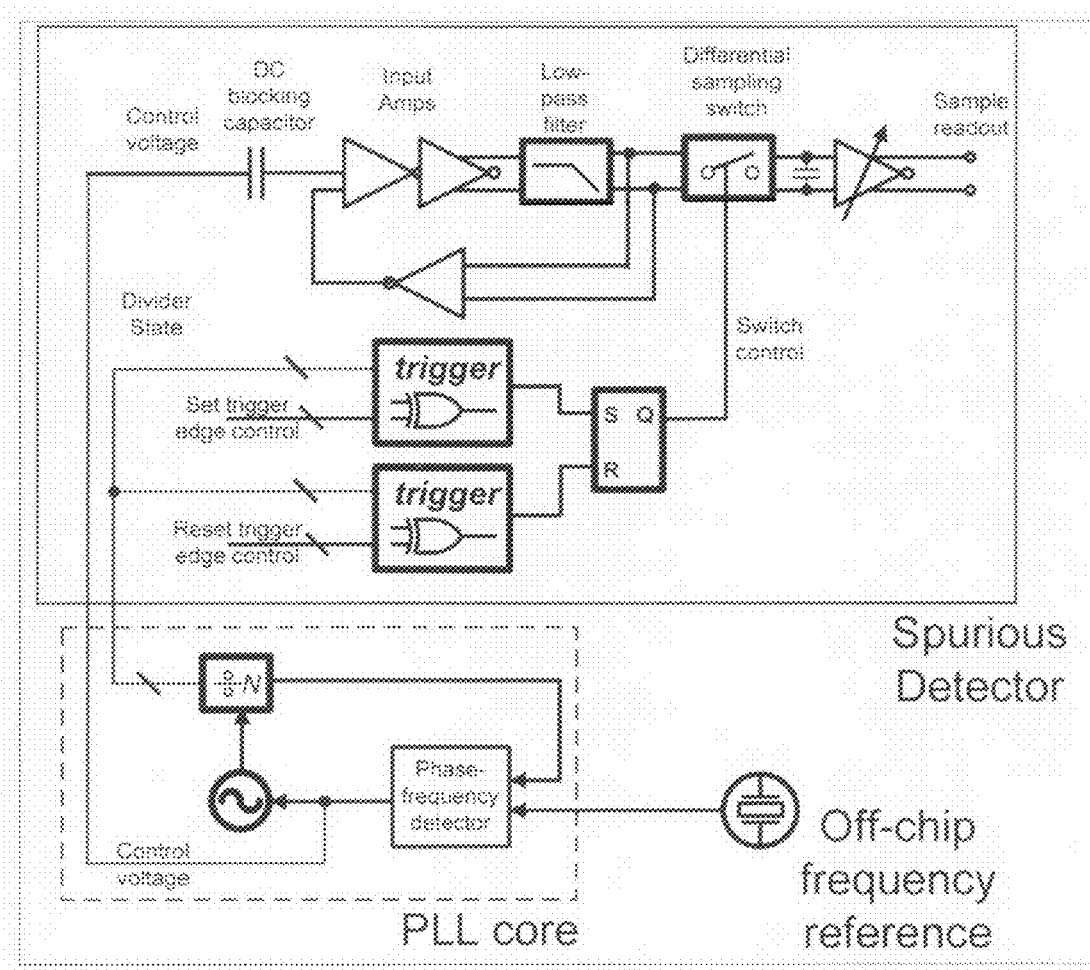
FIG. 22 is a schematic diagram of an illustrative interface strategy for the detector in FIG. 21 with a phase-locked loop synthesizer.

FIG. 22 is a schematic block diagram of an illustrative interface strategy for the detector in FIG. 21 with a phase-locked loop synthesizer. The sampling switch trigger is timed using states from the integer-N divider. In some embodiments, one can use either the actual divider as shown, or replica dividers. The divider states are compared with a desired trigger state such that digital programming allows different, pre-determined divider states to serve as set and reset triggers for the R/S latch controlling the sampling switch.

Figure 23:
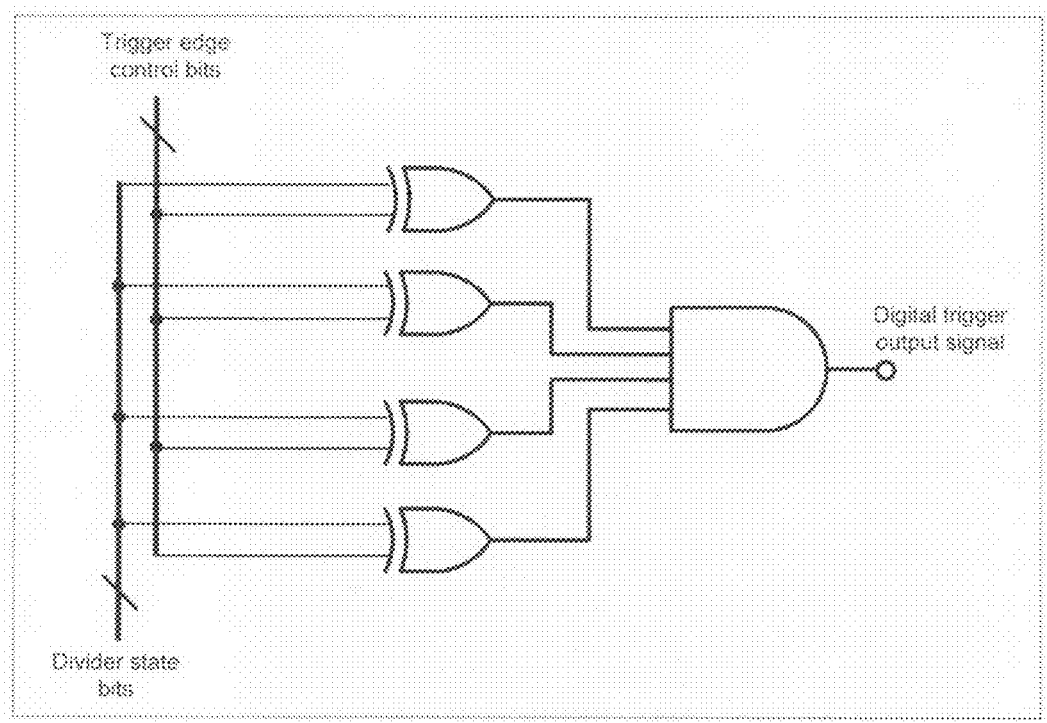
FIG. 23 is a schematic diagram of an illustrative implementation for a 4-bit state comparator to generate set and reset signals for the sampling switch.

FIG. 23 shows an implementation for the state comparator using banks of XOR and (N)AND gates to generate a trigger signal for such a detector. FIG. 23 is a schematic diagram of an illustrative implementation for a 4-bit state comparator to generate set and reset signals for the sampling switch. The comparison is achieved in the XOR gates. All compared bits are ANDed to generate a trigger when all state bits agree with pre-programmed values. More bits can easily be accommodated using additional XOR gates and a wider AND-gate.

Rather than detecting spurious content on the control voltage, another detection scheme (scheme 3) is possible that frequency demodulates the VCO output or a divided, locked version thereof to directly measure the spurious components by measuring the differences in timing of the VCO edges or the edges of the divided VCO signal. FIG. 23 shows an illustrative implementation of such a detector that uses divider states to trigger a pair of current sources to measure the time-difference between two VCO edges in the division cycle. Other known techniques for implementing frequency-demodulators can be used.

Figure 24:
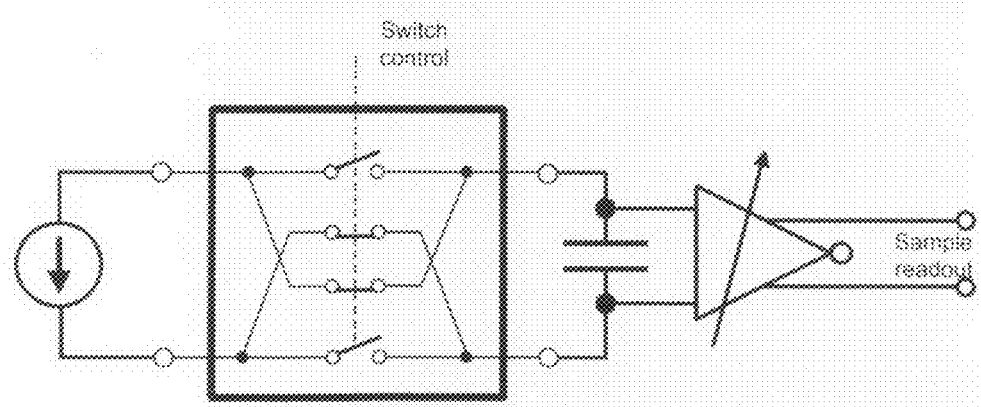
FIG. 24 is a schematic diagram of an illustrative detector of scheme 3 using an FM demodulator.

The two detection techniques of schemes 2 and 3 can be combined by observing that in FIG. 22 and FIG. 23 the state information containing the frequency modulated spurious component is already used to trigger the sampling switch. If instead of sampling the control voltage signal, a current source or a differential current source pair is connected to the sampling switch, the sampled output contains the frequency-modulated component of the VCO signal. FIG. 24 shows an example of this configuration.

FIG. 24 is a schematic diagram of an illustrative detector of scheme 3 using an FM demodulator. The frequency-modulation of the PLL voltage-controlled oscillator (VCO) is directly detected from timing differences present in the rise- and fall times of the divided VCO edges. Many other techniques for frequency-demodulation are known and can be applied for the purpose of this disclosure.

Figure 25:
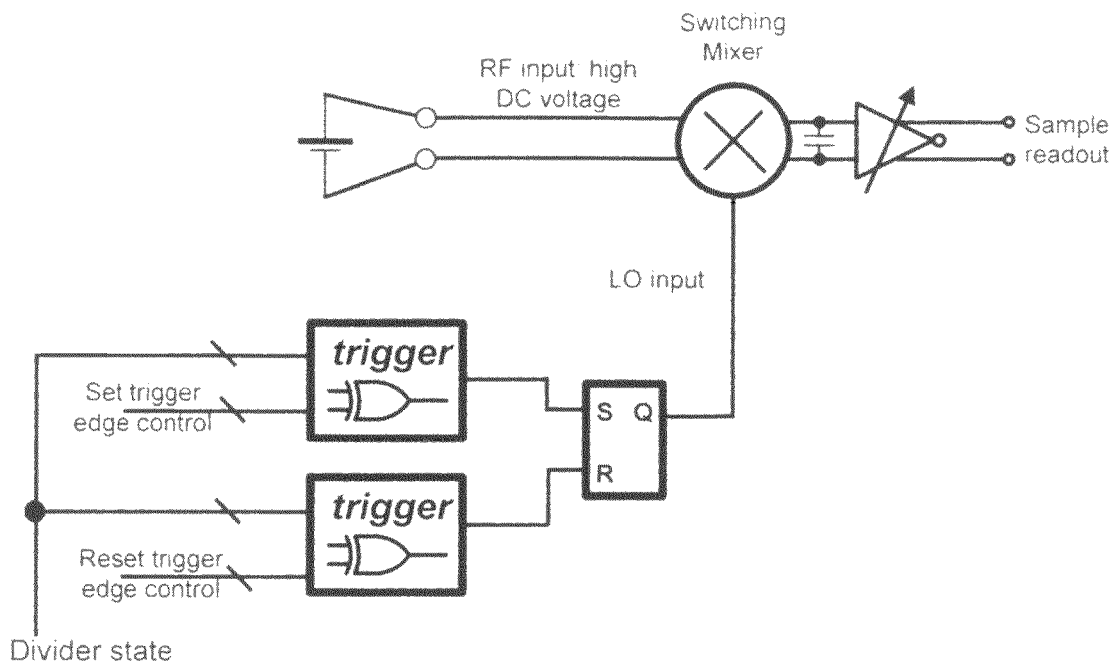
FIG. 25 is a schematic diagram of an illustrative frequency demodulation detector of detection scheme 3.

FIG. 25 shows a detector implementation that uses the loads of a double-balanced Gilbert cell as current sources to be switched for direct FM demodulation. FIG. 25 is a schematic diagram of an illustrative frequency demodulation detector of detection scheme 3 demodulating the FM signal of the divider state output and with it the FM signal in the VCO. A switching mixer can be used to act as a switchable current source. Timing differences in the divided VCO state edges result in edge timing differences and hence DC output on at the output of the mixer cell.

Figure 26:
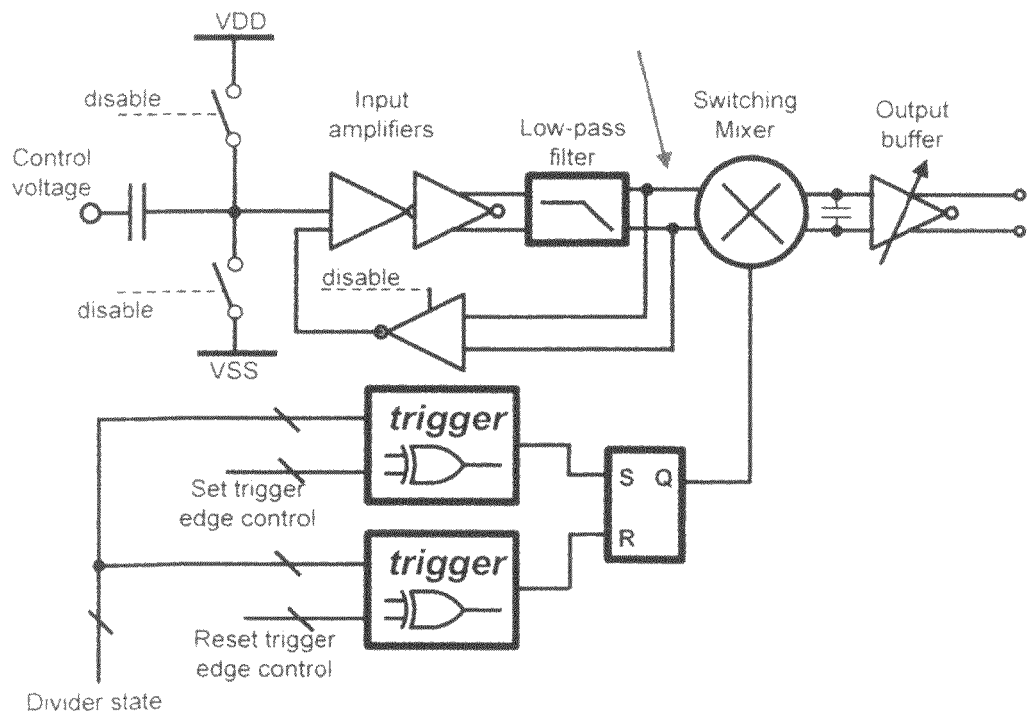
FIG. 26 is a schematic diagram of an illustrative detector as implemented, combining detection schemes 2 and 3.

FIG. 26 combines schemes 2 and 3 in one circuit with a switch controlling whether the Gilbert Cell is configured as a sampling circuit for the control voltage input (by connecting the bandpass filtered control voltage input to the mixer input), or by operating it as an FM demodulator by "railing" the RF input and thus using the Gilbert Cell output as current sources switchable by the divider state input. In the implementation shown, the RF input is railed (or activated towards a large, one-sided DC signal) by deactivating the DC offset feedback loop and applying a large DC signal at the amplifying chain input instead of the control voltage signal.

Referring to FIG. 26, the 'disable' switch disables scheme 2 detection operation (sampling of control voltage waveform) and enables scheme 3 (FM demodulation of divider state timing). When 'disable' is active, the RF input to the switching mixer (arrow) is "railed" with a high differential DC voltage.

To evaluate the above, a detection circuit implementing the ideas of the last scheme as detailed in FIG. 22 and FIG. 23 was designed in an integrated CMOS process.

In this section, several techniques for detecting spurious components in a phased-locked loop synthesizer have been discussed in detail. Any detection technique, however, that can detect the spurious component of the VCO signal is compatible with this disclosure.

Possible applications of the disclosed systems and methods include:
(1) providing a detector capable of detecting the amplitude and phase of the modulated components of the oscillator signal.
(2) providing a detector capable of detecting the power of the modulated components.
(3) providing a detector capable of detecting the total power of all modulated components.
(4) providing a detector capable of detecting the frequency-modulated component of the oscillator signal.
(5) providing a detector as in (4) that employs a sampling switch.
(6) providing a detector as in (4) that employs g a sampling switch to sample the oscillator control voltage or, equivalently, an amplified and/or band-pass filtered version of the oscillator control voltage.
(7) providing a detector as in (4) that employs measurements of the timing of the oscillator signal edge transitions to demodulate the frequency modulation.
(8) providing a detector as in (4) that employs measurements of the timing of the divided oscillator signal edge transitions to demodulate the frequency modulation.
(9) providing a detector as in any of (4) through (8) that employs an analog-to-digital converter at the output to interface with a digital back-end.
(10) providing a detector as in any of (4) through (8) that implements the sampling switch using CMOS or bipolar integrated circuit technology.

Spurious Tone Actuation

Frequency modulated spurious tones can be actuated by purposefully adding an AC signal to the oscillator control voltage that generates, either exactly or approximately, frequency modulation of equal strength and opposing phase at all spurious offset frequencies of interest to either completely cancel or sufficiently reduce the original, frequency-modulated spurious tones. Any AC signal added to the control voltage periodically with the period of the PLL reference signal produces frequency modulation with side-tones at offsets of the reference frequency and its harmonics. For the purpose of reducing or cancelling the spurious side-tones, the magnitudes and phases of the injected fundamental frequency and its harmonics up to the highest harmonic of interest should be adjustable in order to be able to offset or cancel all side-tones up to the highest harmonic of interest.

There are several possibilities of synthesizing an AC signal periodic with the reference frequency and containing power at the fundamental of the reference frequency and its harmonics. For the purpose of actuating (i.e. reducing or eliminating) the PLL spurious tones, the exact synthesis scheme is not important. In the following sections, two such schemes are discussed.

In a first scheme, signals at the reference frequency and its harmonics are synthesized by vector addition of base signals periodic at the reference frequencies and its harmonic with controllable phase and amplitude. Harmonics of the reference tone can be obtained by frequency multiplication of the reference signal. This multiplication is inherently done in all integer-N phase-locked loops, as the VCO signal represents the N-multiple of the reference frequency, and smaller multiples can typically be synthesized by using the state of the PLL divide-by-N circuit (which can take many forms depending on implementation details). With N available states, occurring at equally spaced time-intervals T/N (where T is the reference period), signals with fundamental periods of $$\frac{N}{2T}, \frac{N}{4T}, \ldots$$

down to . . . , 1/T can De synthesized both in-phase and in-quadrature. Controlling the gain and the relative contributions of the in-phase and quadrature components allows one to synthesize an arbitrary signal with period T containing harmonics potentially all the way up to N/2.

Figure 27A:
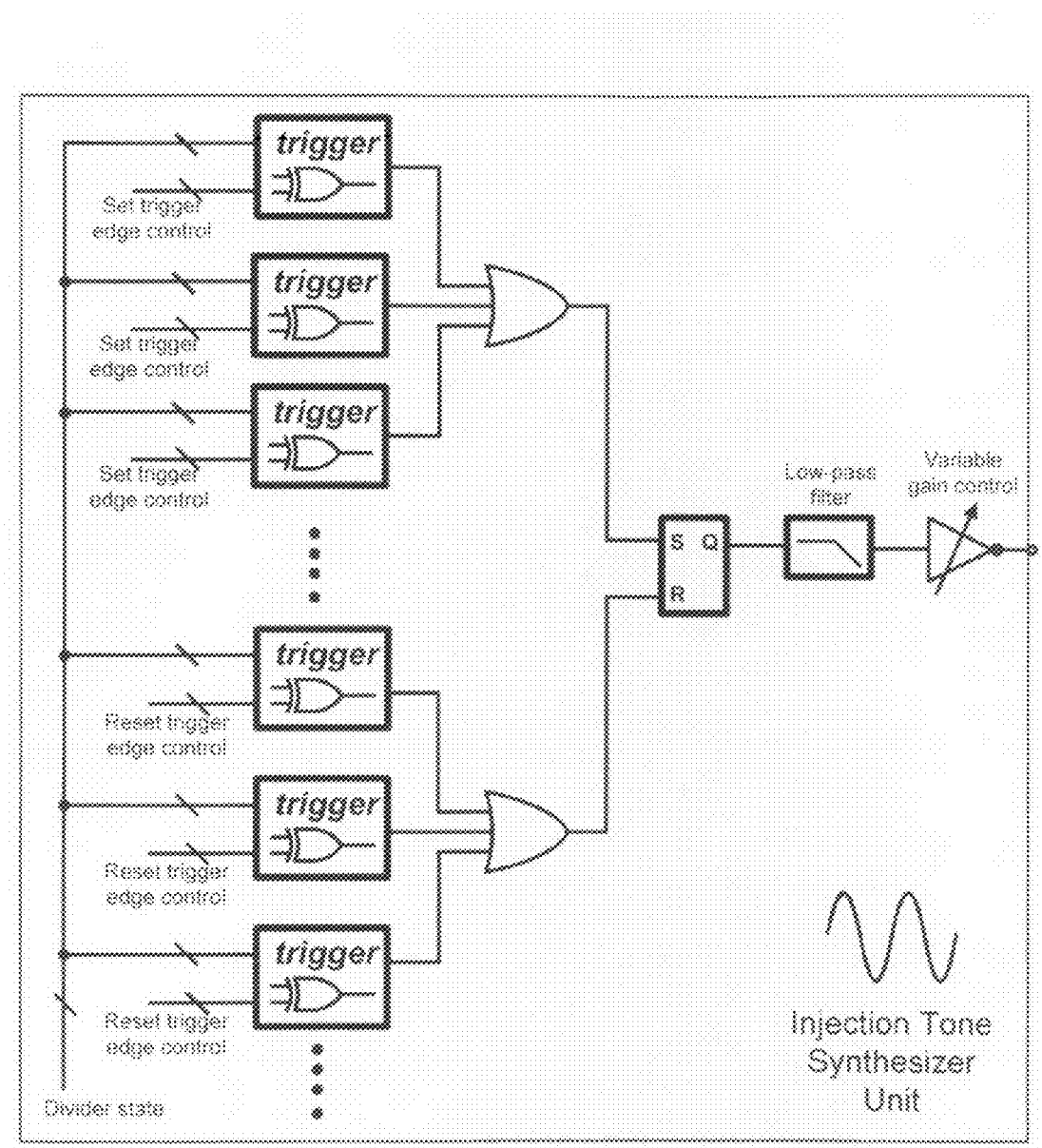
FIG. 27A is a schematic diagram of an illustrative sine-wave generator synchronous with the PLL reference frequency.

FIG. 27A shows the first part of a possible implementation using this scheme. FIG. 27A is a schematic diagram of an illustrative sine-wave generator synchronous with the PLL reference frequency. A square wave is initially generated using available divider states to set and reset and S/R latch periodically. The resulting square-wave is low-pass-filtered and its amplitude is controlled.

The system in FIG. 27A generates a sine-signal of frequency M/T, where T is the PLL reference period. It operates as follows: Initially, the divider state is used to trigger separately rising and falling edges of a pulse generator. For M rising and falling edges, equally spaced, a pulse train with fundamental period T/M is generated. Differently timed edges can be used to generate the desired phase within the accuracy provided by the divider state timing difference. The resulting pulse train can be low-pass filtered as shown to produce a sine-wave signal, but this is not strictly necessary. By changing the number M of rising and falling edges and their occurrence, the phase and frequency of the generated signal is controlled. Finally, an automatic gain control loop with adjustable gain can be used to produce the desired amplitude.

Figure 27B:
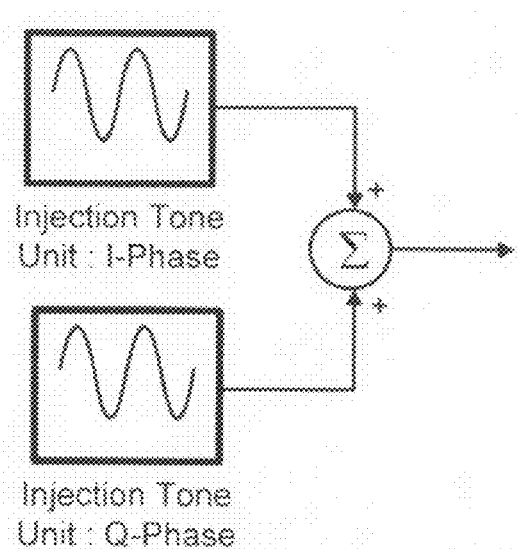
FIG. 27B is a schematic diagram of an alternative generation scheme for a single tone at the reference frequency or one of its harmonics.

In another embodiment, shown in FIG. 27B, in-phase and quadrature components of the sine-wave signals are generated, gain controlled, and finally added using Cartesian addition, such that the resulting signal is again a signal of controllable amplitude and phase. FIG. 27B is a schematic diagram of an alternative generation scheme for a single tone at the reference frequency or one of its harmonics. Two generators of FIG. 27A are connected in parallel, and operated to provide I- and Q-outputs (90 degree out-of-phase). Since each components amplitude can be controlled separately (see FIG. 27A), the resulting output after signal addition has fully controllable amplitude and phase.

Figure 28:
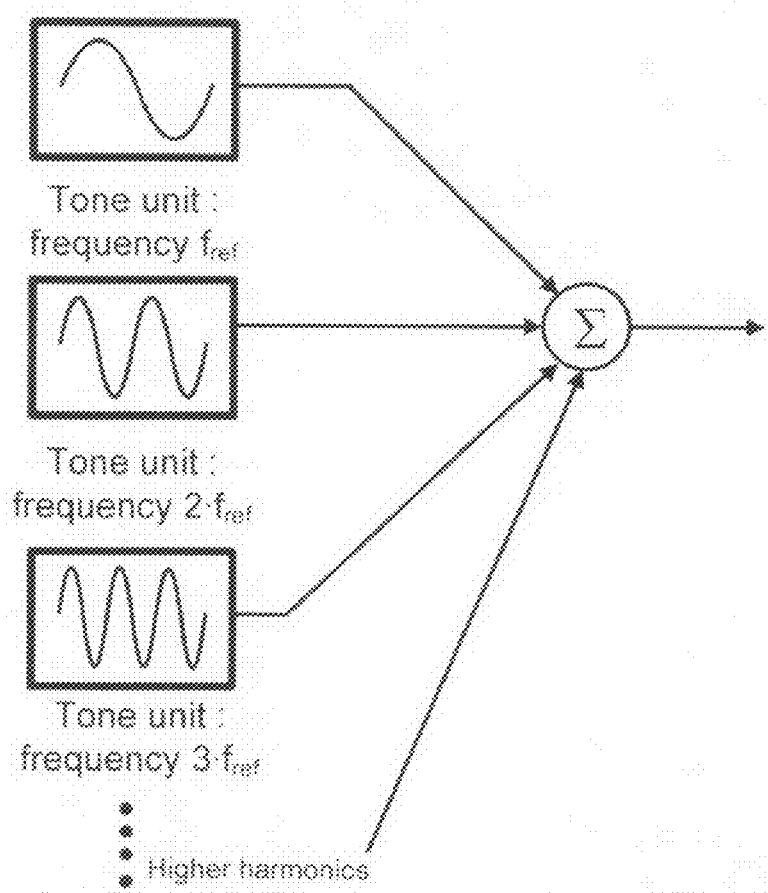
FIG. 28 is a schematic diagram that illustrates adding the tone generators of either FIG. 27A or FIG. 27B in parallel.

FIG. 28 is a schematic diagram that illustrates adding the tone generators of either FIG. 27A or FIG. 27B in parallel. With each generator generating a tone at a different harmonic of the reference frequency, an arbitrary waveform synchronous with the reference signal having the same period can be synthesized.

Generating components at the reference frequency and its harmonics in parallel as shown in FIG. 28 could complete a fully controllable signal generator used to inject an actuation signal into the VCO control voltage as shown, where the DC blocking capacitor blocks the DC component.

Another alternative scheme relies on the observation that with N channels used in parallel, 2N degrees of freedom are obtained (N amplitudes and N phases for each of the N harmonics). One can obtain the same number of degrees of freedom by simply adding N base signals of controllable amplitude and occurrence within the reference time-period. The exact shape of the base signal itself is almost arbitrary as long as it periodic within the PLL reference time period and contains harmonics up to the desired harmonic of interest. By adding N such signals of controlled amplitude and timing (phase), a new signal periodic with period T is synthesized with 2N degrees of freedom that can be used to control the amplitudes and phases of the first N harmonics of the generated signal.

Figure 29:
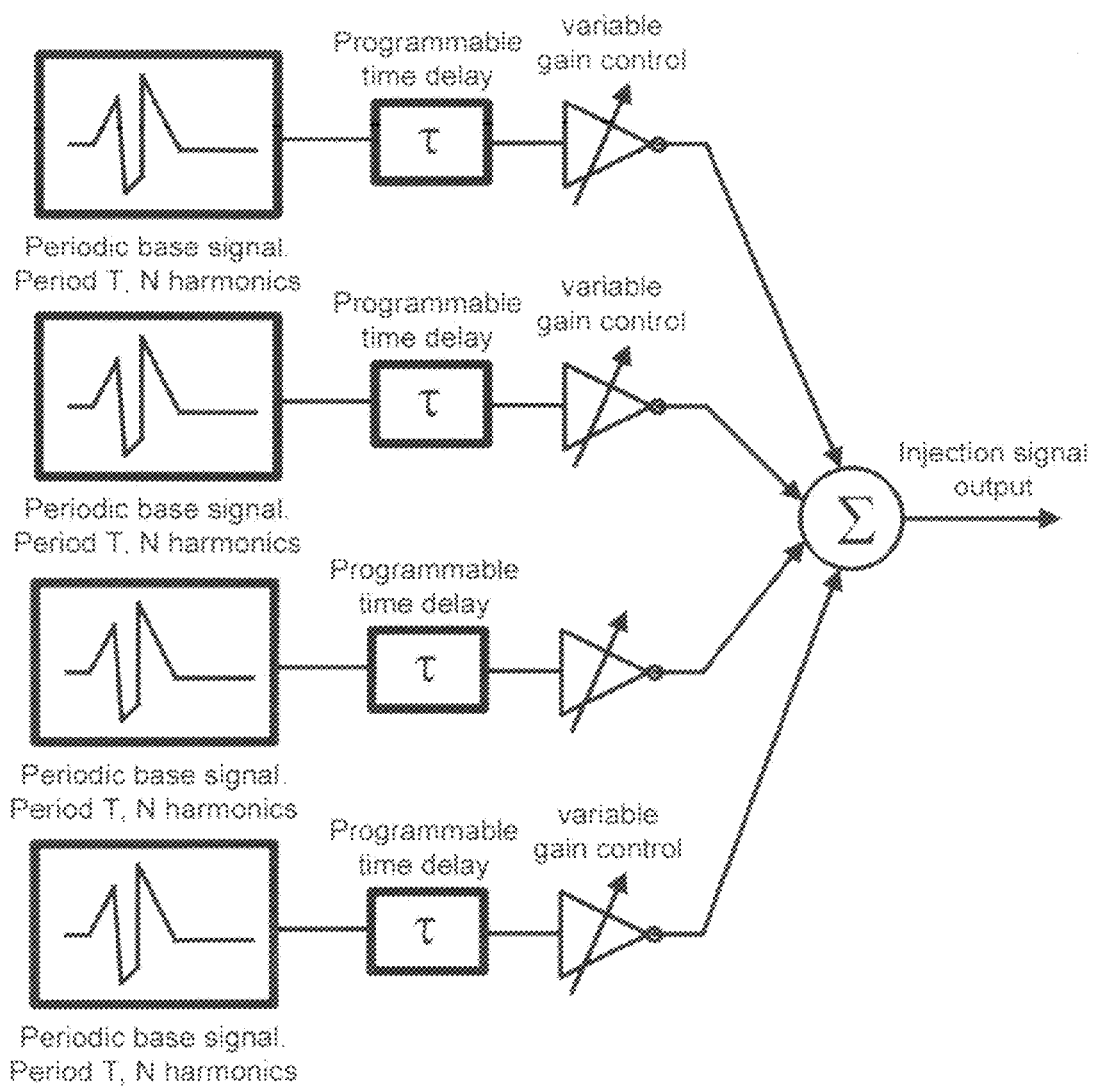
FIG. 29 is a schematic diagram of an alternative synchronous injection tone-generator. Instead of sine-waves, each of the four parallel channels synthesizes a short pulse of controllable amplitude and phase (delay within the reference clock cycle).

FIG. 29 shows a synthesizer using this scheme, which was implemented as an integrated CMOS circuit with four parallel channels. FIG. 29 is a schematic diagram of an alternative synchronous injection tone-generator. Instead of sine-waves, each of the four parallel channels synthesizes a short pulse of controllable amplitude and phase (delay within the reference clock cycle). For the first four harmonics, this is equivalent to an arbitrary tone generator for four harmonics, as eight degrees of freedom exist, that allow one to generate a signal with the same period as the PLL reference having any combination of amplitude and phase for the first four harmonics.

Figure 30A:
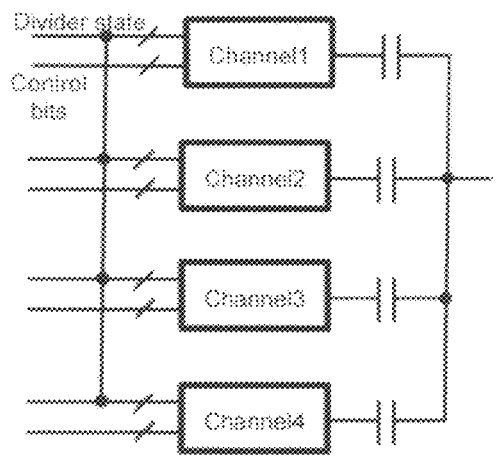
FIG. 30A is a schematic diagram of an implementation in which four parallel channels were used for the injection tone generator.

In an implemented circuit, four parallel channels are used with the base signal being generated by injecting a charge of digitally controllable amount into the VCO control voltage at a digitally controllable time within the reference clock cycle FIG. 30A is a schematic diagram of an implementation in which four parallel channels were used for the injection tone generator. The implementation is very similar to the one illustrated in FIG. 29.

Figure 30B:
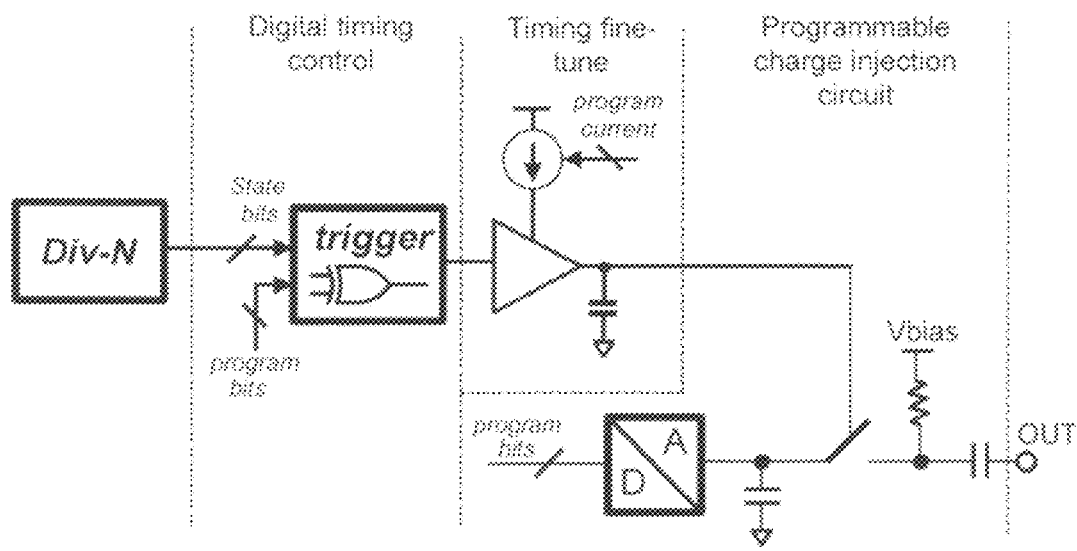
FIG. 30B is a schematic diagram that shows the detail of each identical Spurious injection circuit channel of FIG. 30A.

FIG. 30B is a schematic diagram that shows the detail of each identical Spurious injection circuit channel of FIG. 30A. The divider state bits are used to generate a digitally timed trigger signal. The timing is refined using a current starved delay cell, and the resulting trigger with adjustable timing anywhere within the reference clock cycle, activates a switch that deposits a programmable charge at the control voltage node (OUT).

Feedback Control for Spurious Tone Actuation

With smaller feature-size devices, leakage currents increase and available voltage headroom decreases, both resulting in increased spurious frequency output, as devices have to be made larger to compensate for headroom constraints and higher charges have to be periodically injected to offset higher leakage currents. This is somewhat offset by lower device capacitances due to the smaller devices available as switches. Monte-Carlo simulations using a 65 nm CMOS process with a ported version indicates a statistical distribution of spurious level as shown.

The above actuation and sense mechanisms lend themselves most easily to a low-duty cycle digital control rather than traditional feedback-based analog control mechanisms. It is believed that the self-healing approach is ideally suited for spurious output reduction in frequency-synthesizers with little overhead on the analog circuit side.

In order to provide closed-loop feedback, a digital back-end could be used that processes information from the detector digitally and adjust the controllable parameters in the actuation circuits according to the reading to reduce, minimize and/or completely eliminate the spurious tones in the VCO signal.

Depending on the specific detector used (and hence the information available), many feedback control processes are possible. Two are discussed in the following sections.

In the first feedback control scheme, amplitude and phase information of all spurious side-bands of interest is used. This information is available in detection schemes 2 and 3 of the detection section. The information is read-out and stored by the digital feedback back-end. A test actuation signal is injected. The now-different amplitude and phase information of the spurious side-bands is read out again. The difference between the original and the new spurious side-tone information (e.g., that is its vector difference) is the phase and amplitude of the actuation signal and its harmonics that offsets the original spurious tone generating signal with its harmonics. Adjusting the amplitude of this offset signal and its injection timing can be used to predictably adjust the amplitudes and phases of the offset signal fundamental and its harmonics. The control process is expected, by mathematical calculation, quickly to determine the appropiate amplitudes and phases of correction signals to be injected in parallel.

In another feedback control scheme, the power of the spurious tone signal is used, in which either total power or power of individual harmonics of interest can be used. A single arbitrary actuation signal is injected, and its timing is varied to sweep through the entire reference frequency period. At each step, the power of the spurious tone signal is recorded. Upon completion of the sweep, the recorded power curve(s) have power maxima and minima, each of which can serve as a time-point for injection. Initially, one of these times for injection that results in a local maximum or minimum is chosen. The amplitude of the injected signal is then adjusted through a gradient descent until the detected output power is a (local)

minimum, in order to successively minimize the spurious tone power. The power is recorded. At this point, two possibilities exist: first, with this initial offset signal in place, the same search is repeated using a new, parallel injection channel, with a new, lower total minima achieved with successively more parallel actuation channels used until desired performance is achieved. This approach results in faster initial convergence. The second possibility is to repeat the power gradient descent at all original local power maxima and minima, storing the values of all power minima and finally selecting the overall power minimum, i.e. the setting for timing/phase and amplitude for the first injection channel that results in an initial global power minimum. At this point, the same procedure can be repeated (with the initial actuation channel active) using successively more parallel actuation channels. This approach, compared to the first possibility in this second scheme, uses the available channels more effectively, but results in longer initial convergence times.

Other feedback control schemes can be used as long as the actuation circuit provides sufficient degrees of freedom to adjust amplitudes and phases of the actuation signal fundamental and its harmonics (as discussed above) and the detection circuit is capable of detecting the precise object of minimization interest (e.g. total power). The detection scheme (3) discussed above is capable of such as it detects all spurious tones of interest in phase and amplitude. The detection scheme (2) above is similarly capable with the assumption that all spurious tones occur on the control voltage node.

In summary, the systems and methods disclosed are used to detect spurious tones in an integer-N PLL, to actuate, reduce, minimize and/or eliminate such spurious tones, and to automate this actuation process through a closed loop feedback system.

Definitions

Recording the results from an operation, such as for example, recording results at a particular wavelength or frequency, is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing to memory" is defined herein as including writing transformed data (e.g., a result of a computation) to registers within a microcomputer.

"Microcomputer" is defined herein as synonymous with microprocessor, microcontroller, and digital signal processor ("DSP"). It is understood that memory used by the microcomputer, including for example an imaging or image processing algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A self-healing integrated circuit system, comprising:
    an integrated circuit comprising at least a first plurality of nominally identical circuit blocks each configured to perform an operation in response to an input signal and to provide a response signal, said at least a first plurality of nominally identical circuit blocks each having a respective at least one input terminal and having a respective at least one output terminal;
    a measurement module configured to measure a respective response to a test signal applied to of each of at least two of said at least a first plurality of nominally identical circuit blocks, each of said respective responses indicative of at least one parameter or characteristic of said respective one of said at least two of said at least a first plurality of nominally identical circuit blocks, said measurement module configured to be placed in electrical communication with each of said at least two of said at least a first plurality of nominally identical circuit blocks during a test duration, said measurement module configured to provide said test signal and to provide as data said respective responses;
    an analysis module configured to receive as input said respective responses, configured to analyze said respective responses to extract information indicative of the respective at least one parameter or characteristic of each of said at least two of said at least a first plurality of nominally identical circuit blocks, and configured to make a determination whether a corrective action is to be applied to any of said respective ones of said at least two of said at least a first plurality of nominally identical circuit blocks, said analysis module having at least one output at which said determination is provided as a signal; and
    a correction module configured to receive said determination as input and to apply said respective corrective action to each of said at least two of said at least a first plurality of nominally identical circuit blocks.

2. The self-healing integrated circuit system of claim 1, wherein said integrated circuit is a radio receiver.

3. The self-healing integrated circuit system of claim 1, wherein said measurement module is configured to isolate each of said at least two of said at least a first plurality of nominally identical circuit blocks during said test duration.

4. The self-healing integrated circuit system of claim 1, wherein said at least one parameter or characteristic is a frequency response.

5. The self-healing integrated circuit system of claim 1, wherein said at least one parameter or characteristic is an I/Q mismatch.

6. The self-healing integrated circuit system of claim 1, wherein said at least one parameter or characteristic is an absolute gain variation.

7. The self-healing integrated circuit system of claim 1, wherein said at least one parameter or characteristic is a generated phase relationship between two signals.

8. The self-healing integrated circuit system of claim 1, wherein said at least one parameter or characteristic is an array peak to null ratio.

9. The self-healing integrated circuit system of claim 1, wherein said at least one parameter or characteristic is a spurious frequency tone that is to be removed.

10. The self-healing integrated circuit system of claim 1, wherein all of said integrated circuit, said measurement module, said analysis module, and said correction module are integrated on a single substrate.

11. A method of self-healing an integrated circuit, comprising the steps of:
    providing an self-healing integrated circuit system, comprising:
        an integrated circuit comprising at least a first plurality of nominally identical circuit blocks;
        a measurement module;
        an analysis module; and
        a correction module;
    measuring a respective response to a test signal applied to of each of at least two of said at least a first plurality of nominally identical circuit blocks, each of said respective responses indicative of at least one parameter or characteristic of said respective one of said at least two of said at least a first plurality of nominally identical circuit blocks;
    analyzing said respective responses to extract information indicative of the respective at least one parameter or characteristic of each of said at least two of said at least a first plurality of nominally identical circuit blocks;
    determining whether a corrective action is to be applied to any of said respective ones of said at least two of said at least a first plurality of nominally identical circuit blocks; and
    applying said respective corrective action to each of said at least two of said at least a first plurality of nominally identical circuit blocks.

12. The method of self-healing an integrated circuit of claim 11, further comprising the optional steps of repeating said measuring, analyzing and determining steps to observe an effect of said applied respective corrective actions.

13. The method of self-healing an integrated circuit of claim 11, wherein said measuring step is applied to each of said at least two of said at least a first plurality of nominally identical circuit blocks in a sequential procedure.

14. The method of self-healing an integrated circuit of claim 11, wherein said measuring step is applied to each of said at least two of said at least a first plurality of nominally identical circuit blocks in a parallel procedure.

15. The method of self-healing an integrated circuit of claim 11, wherein all of said integrated circuit, said measurement module, said analysis module, and said correction module are integrated on a single substrate.

* * * * *